US010936927B2

(12) United States Patent
Sundaresan et al.

(10) Patent No.: US 10,936,927 B2
(45) Date of Patent: Mar. 2, 2021

(54) TAGGING OBJECTS IN INDOOR SPACES USING AMBIENT, DISTRIBUTED BACKSCATTER

(71) Applicant: NEC Laboratories America, Inc., Princeton, NJ (US)

(72) Inventors: Karthikeyan Sundaresan, Manalapan, NJ (US); Eugene Chai, Monmouth Junction, NJ (US); Sampath Rangarajan, Bridgewater, NJ (US); Mohammad Rostami, Amherst, MA (US)

(73) Assignee: NEC CORPORATION

( * ) Notice: Subject to any disclaimer, the term of this patent is extended or adjusted under 35 U.S.C. 154(b) by 0 days.

(21) Appl. No.: 16/743,737

(22) Filed: Jan. 15, 2020

(65) Prior Publication Data
US 2020/0151532 A1 May 14, 2020

Related U.S. Application Data

(63) Continuation-in-part of application No. 16/381,294, filed on Apr. 11, 2019.
(Continued)

(51) Int. Cl.
*G08B 21/00* (2006.01)
*G06K 19/07* (2006.01)
(Continued)

(52) U.S. Cl.
CPC ......... *G06K 19/0725* (2013.01); *G06K 7/01* (2013.01); *G06K 7/10297* (2013.01); *G06Q 10/087* (2013.01); *H04L 27/10* (2013.01)

(58) Field of Classification Search
CPC .. G06K 19/0725; G06K 7/10297; G06K 7/01; G06Q 10/087; H04L 27/10; H04L 27/2601; H04L 27/36; H04B 1/59
See application file for complete search history.

(56) References Cited

U.S. PATENT DOCUMENTS

| 2006/0151613 A1* | 7/2006 | Zmood | G06K 7/086 235/492 |
| 2009/0303005 A1* | 12/2009 | Tuttle | G06K 7/10316 340/10.1 |

(Continued)

OTHER PUBLICATIONS

Iyer et al., "Inter-Technology Backscatter Towards Internet Connectivity for Implanted Devices", SIGCOMM, Aug. 2016, 14 pages.
(Continued)

*Primary Examiner* — Mark S Rushing
(74) *Attorney, Agent, or Firm* — Joseph Kolodka

(57) ABSTRACT

A product tagging system is provided. The product tagging system includes at least one RF backscatter transmitter configured to emit (i) a main carrier RF signal, and (ii) Radio Frequency (RF) signals on two frequencies whose summation forms a twin carrier RF signal. The product tagging system further includes a passive RF backscatter tag associated with a product and configured to reflect and frequency shift the main carrier RF signal to a different frequency using the twin carrier RF signal. The product tagging system also includes at least one RF backscatter receiver configured to read the product on the different frequency by detecting a distributed ambient backscatter signal generated by a reflection and frequency shifting of the main carrier RF signal by the passive RF backscatter tag.

20 Claims, 18 Drawing Sheets

Related U.S. Application Data

(60) Provisional application No. 62/799,002, filed on Jan. 30, 2019, provisional application No. 62/657,704, filed on Apr. 13, 2018, provisional application No. 62/696,928, filed on Jul. 12, 2018.

(51) Int. Cl.
| | | |
|---|---|---|
| *G06K 7/10* | (2006.01) | |
| *G06K 7/01* | (2006.01) | |
| *G06Q 10/08* | (2012.01) | |
| *H04L 27/10* | (2006.01) | |

(56) References Cited

U.S. PATENT DOCUMENTS

2016/0301257 A1* 10/2016 Parks .................... H02J 50/20
2017/0262669 A1   9/2017 Tuttle
2017/0364715 A1  12/2017 Sadr

OTHER PUBLICATIONS

Zhang et al., "Enabling Practical Backscatter Communication for On-body Sensors", SIGCOMM, Aug. 2016, 14 pages.

\* cited by examiner

TAGGING OBJECTS IN INDOOR SPACES USING AMBIENT, DISTRIBUTED BACKSCATTER

RELATED APPLICATION INFORMATION

This application is a Continuation-In-Part (CIP) of U.S. patent application Ser. No. 16/381,294, filed on Apr. 11, 2019, incorporated herein by reference in its entirety.

BACKGROUND

Technical Field

The present invention relates to object detection and more particularly to tagging objects in indoor spaces using ambient, distributed backscatter.

Description of the Related Art

Today, retailers are unable to gather insights into the shopping and consumption behavior of everyday products by their consumers. This arises from the inability to tag and monitor everyday products in consumer spaces in a cost-effective and scalable manner. Hence, there is a need for a way to tag everyday products in consumer spaces in a cost-effective and scalable manner.

SUMMARY

According to an aspect of the present invention, a product tagging system is provided. The product tagging system includes at least one RF backscatter transmitter configured to emit (i) a main carrier RF signal, and (ii) Radio Frequency (RF) signals on two frequencies whose summation forms a twin carrier RF signal. The product tagging system further includes a passive RF backscatter tag associated with a product and configured to reflect and frequency shift the main carrier RF signal to a different frequency using the twin carrier RF signal. The product tagging system also includes at least one RF backscatter receiver configured to read the product on the different frequency by detecting a distributed ambient backscatter signal generated by a reflection and frequency shifting of the main carrier RF signal by the passive RF backscatter tag.

According to another aspect of the present invention, a methods is provided for product tagging. The method includes emitting, by at least one RF backscatter transmitter, (i) a main carrier RF signal, and (ii) Radio Frequency (RF) signals on two frequencies whose summation forms a twin carrier RF signal. The method further includes reflecting and frequency shifting, by a passive RF backscatter tag associated with a product, the main carrier RF signal to a different frequency using the twin carrier RF signal. The method also includes reading, by at least one RF backscatter receiver, the product on the different frequency by detecting a distributed ambient backscatter signal generated by a reflection and frequency shifting of the main carrier RF signal by the passive RF backscatter tag.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to tagging objects in indoor spaces using ambient, distributed backscatter.

In an embodiment, an ambient, distributed, orthogonal back scattering solution is provided. One or more embodiments of the present invention involve low-cost, passive, orthogonal backscattering tags to tag everyday products, while repurposing the existing wireless interfaces in smart devices (e.g., smartphones, voice-activated speakers, and so forth) to monitor the products (read the tags). By leveraging ambient backscattering, embodiments of the present invention do not require an RFID infrastructure, and by enabling orthogonal bands (one band for transmitting and another band for receiving) through its carefully designed passive tags, can accomplish backscattering using two separate (existing) devices without the need for self-interference cancelation. The present invention can be used to show significant insights into consumer shopping behavior for retailers as well as provide other benefits as readily appreciated by one of ordinary skill in the art given the teachings of the present invention provided herein.

Figure 1:
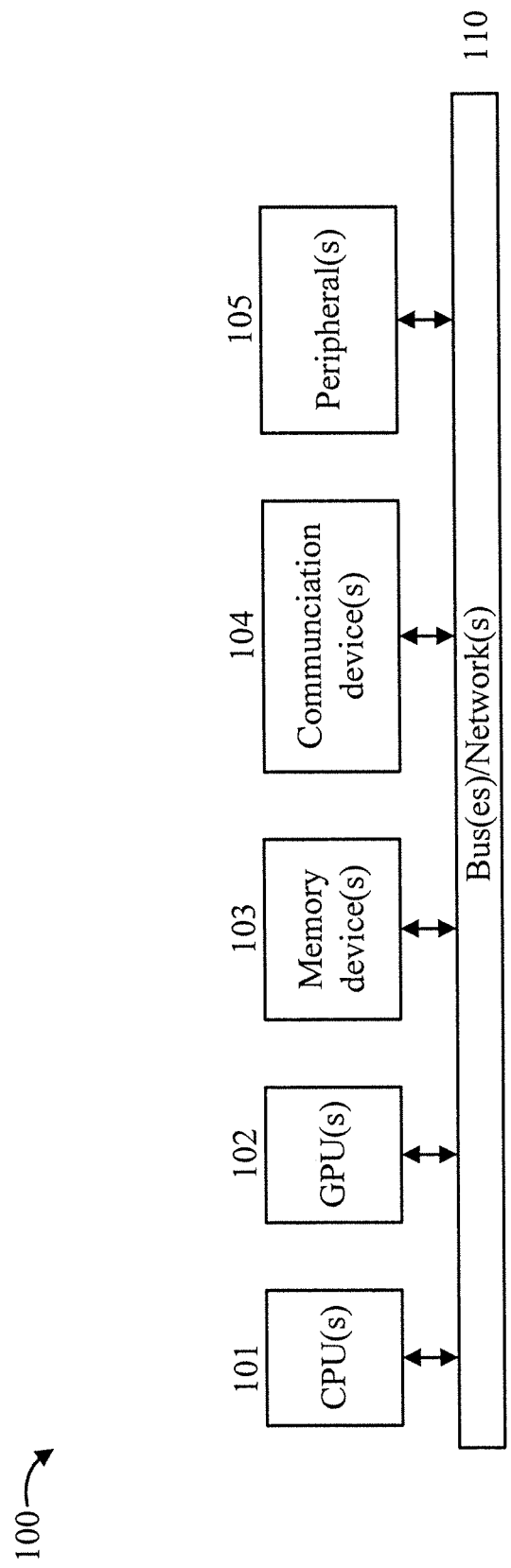
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules in order to transform the computer processor system in a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100. Moreover, system 100 can be used to analyze results of the tagging and to perform actions responsive to tagging results. These and other uses of system 100 are readily determined by one of ordinary skill in the art given the teachings of the present invention provided herein, while maintaining the spirit of the present invention.

Figure 2:
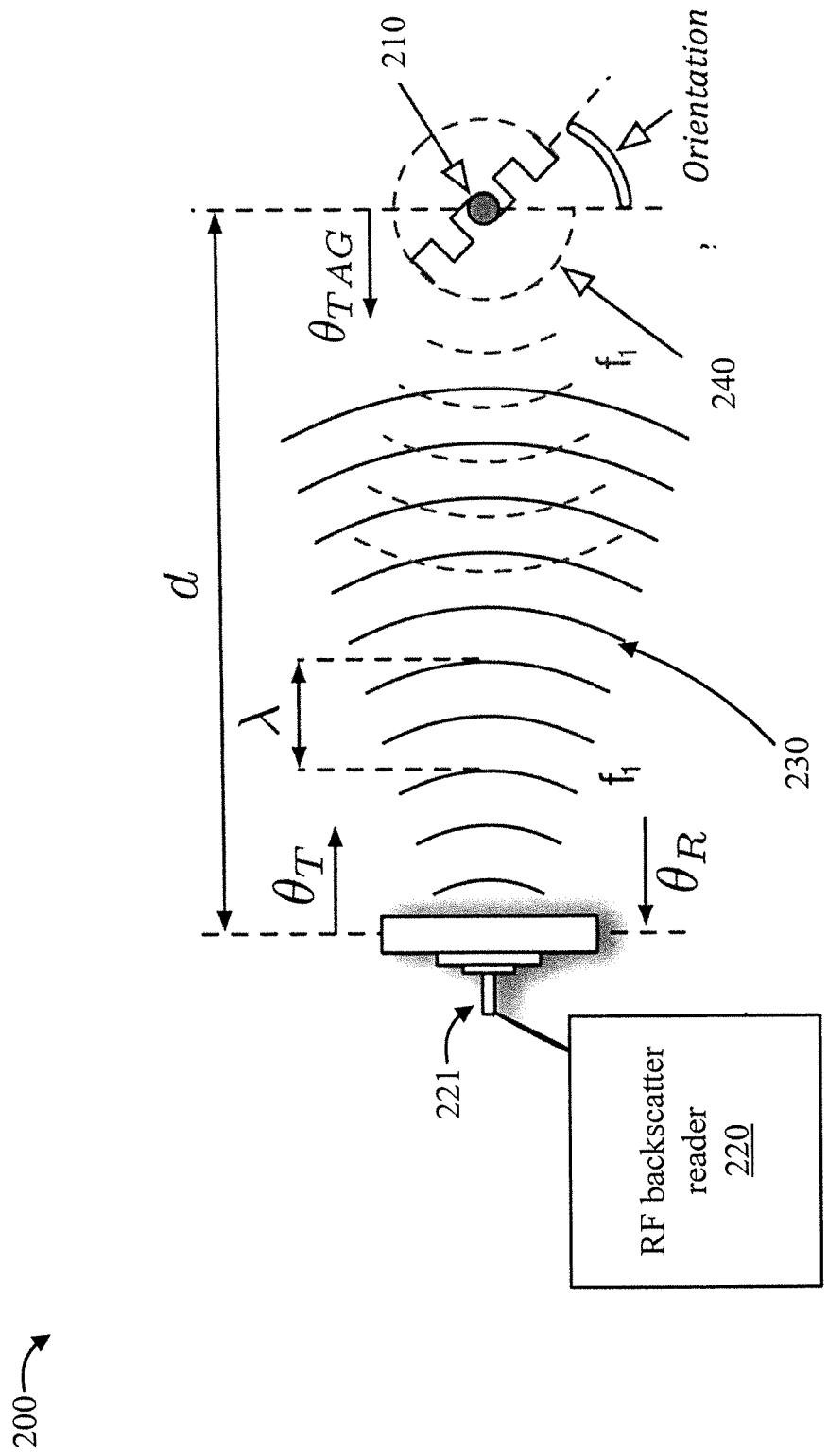
FIG. 2 is a block diagram showing an exemplary RF backscattering mechanism to which the present invention can be applied, in accordance with an embodiment of the present invention.

One or more embodiments of the present invention leverage passive radio frequency (RF) tags to tag and monitor everyday objects. Passive RF tags do not require a battery and cost a few cents each. The RF tags can be pasted onto objects and work by simply backscattering (reflecting) the signal energy sent by the transmitter, thereby eliminating the need to generate their own signal, as shown in FIG. 2. By modulating the state of the reflected signal, the tag is able to convey information stored in it, which could be related to the object that it tags. While the amount of information that can be delivered by a RF tag is limited (few tens to hundreds of Kbps for UHF tags), its low cost, small form factor and passive nature, allows for scalable tagging of everyday objects in consumer spaces.

FIG. 2 is a block diagram showing an exemplary RF backscattering mechanism 200 to which the present invention can be applied, in accordance with an embodiment of the present invention.

The backscattering mechanism 200 involves a passive RF tag 210 and an RF reader 220 with an RF antenna 221.

In FIG. 2, d denotes a distance between the RF antenna 221 to the RF tag 210, $\lambda$, denotes a wavelength of the transmitted wave 230, $\theta_T$ denotes the phase of the transmit signal, $\theta_R$ denotes the phase of the backscattered received signal, and $f_1$ denotes a frequency of the transmitted wave 230 and also of the backscatter wave 240.

In operation, a Radio Frequency (RF) wave 230 is transmitted from the antenna 221 of the RF reader 220. Depending upon an orientation of the RF tag 210, the RF wave 230 reflects the RF wave 230 back to the RF antenna 221 as a backscatter wave 240. Moreover, by modulating the state of the reflected signal, i.e., the backscatter wave 240, the passive RF tag 210 is able to convey information stored in the passive RF tag 210.

The present invention enables low-cost, reliable tagging of everyday objects through the innovation of ambient, distributed, orthogonal-band backscattering on existing WIFI and Bluetooth capable devices. It has the following features. A first feature is (i) ambient: it leverages existing RF technologies such as WIFI and Bluetooth in smart devices, hubs and routers, that are already present in indoor spaces to enable backscattering. This avoids the need for an additional RFID-specific infrastructure (RFID readers and antennas). A second feature is (ii) distributed: instead of relying on a single, mono-static backscatter reader (i.e., joint Tx and Rx) with limited read reliability, it distributes the Tx and Rx functionality (henceforth referred to as B-Tx and B-Rx) of backscattering to two distributed devices in the environment (bi-static backscattering); this allows for the mobility of one or both of these devices to increase the diversity of channels and hence the reliability of tag reads. A third feature is (iii) orthogonal backscattering: bi-static readers deployed on two different devices (not just antennas), but same frequency band, face a serious issue known as self-interference; the latter significantly degrades the receiver's ability to decode the tag responses. The present invention eliminates this issue by instrumenting an orthogonal-band tag. The latter is capable of either backscattering simultaneously on an additional band that is orthogonal to that used by the B-Tx (dual-band tags), or backscattering directly on a different orthogonal channel (frequency-shifting tags). Both these approaches allow the B-Rx to bypass the need for canceling self-interference by receiving the tag's response on a band that is different (orthogonal) from that of the B-Tx.

A description will now be given regarding ambient, distributed backscatter, in accordance with one or more embodiments of the present invention.

Figure 3:
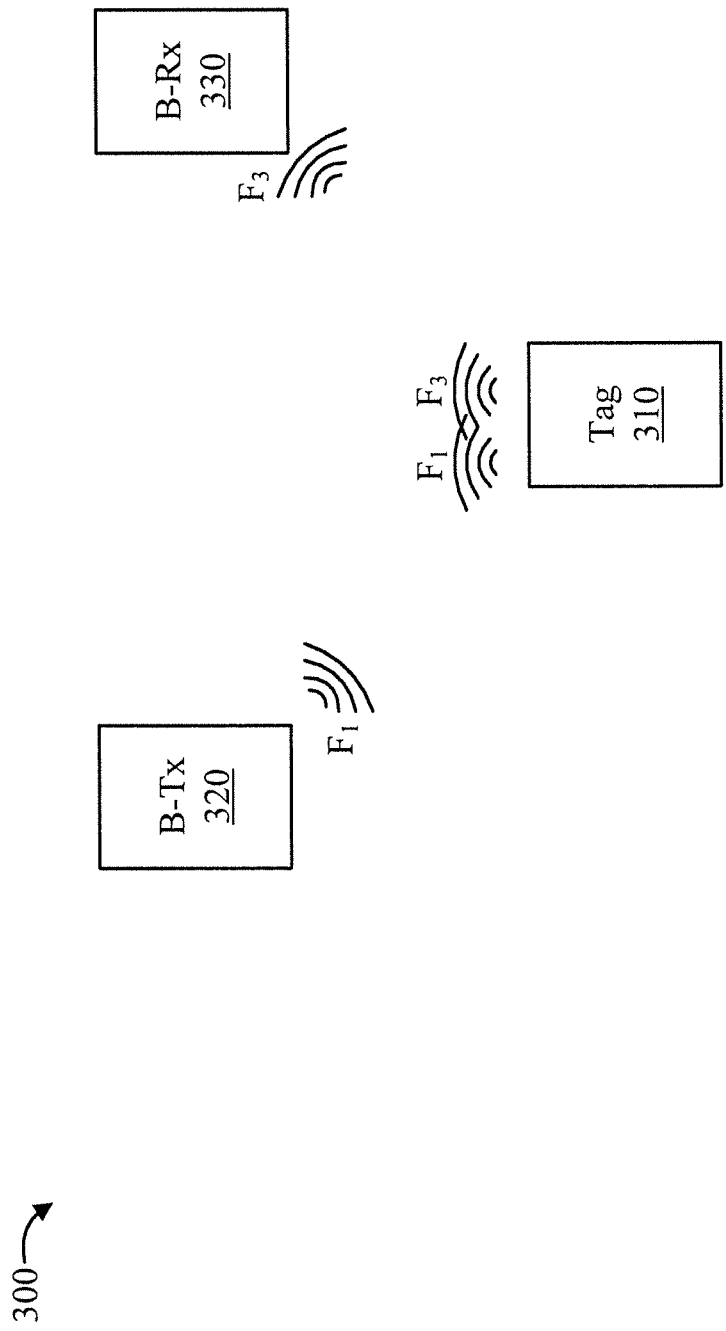
FIG. 3 is a block diagram showing an exemplary operation of the present invention involving harmonic tags, in accordance with an embodiment of the present invention.
Figure 4:
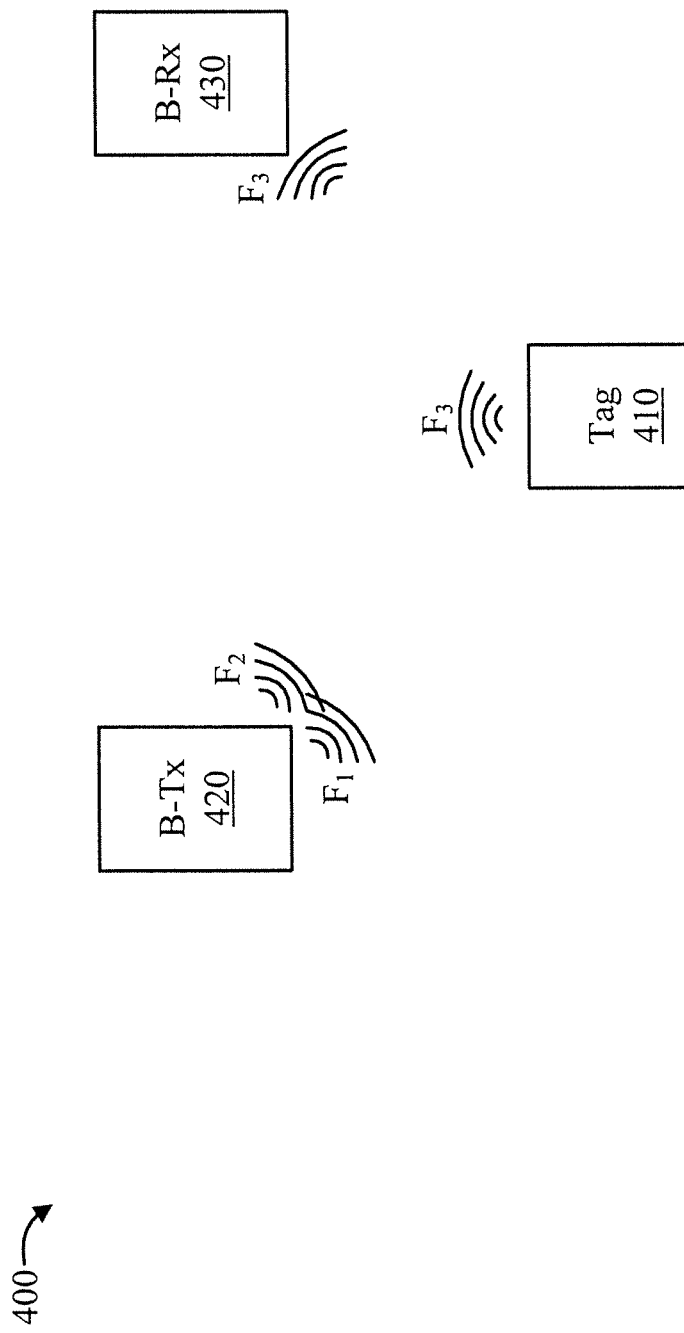
FIG. 4 is a block diagram showing an exemplary operation of the present invention involving frequency-shifting tags, in accordance with an embodiment of the present invention.
Figure 5:
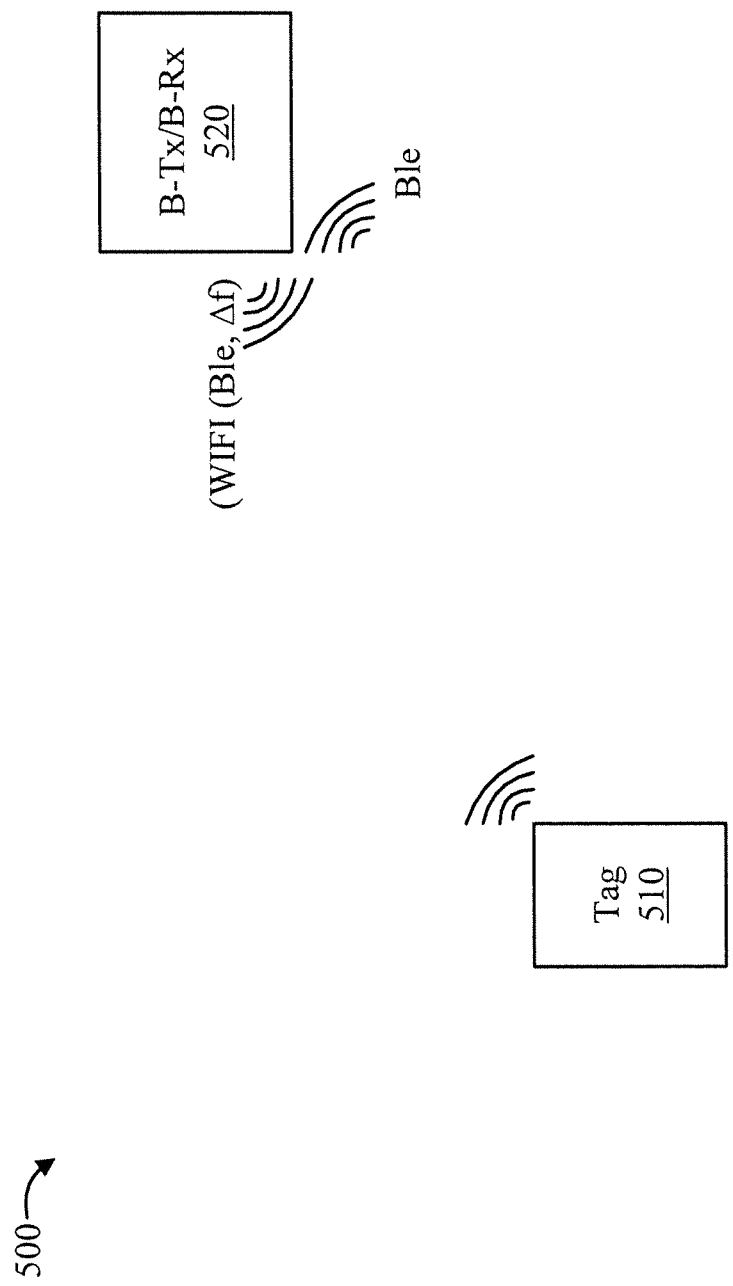
FIG. 5 is a block diagram showing an exemplary operation of the present invention involving a mono-static setup that uses a mobile device, in accordance with an embodiment of the present invention.
Figure 6:
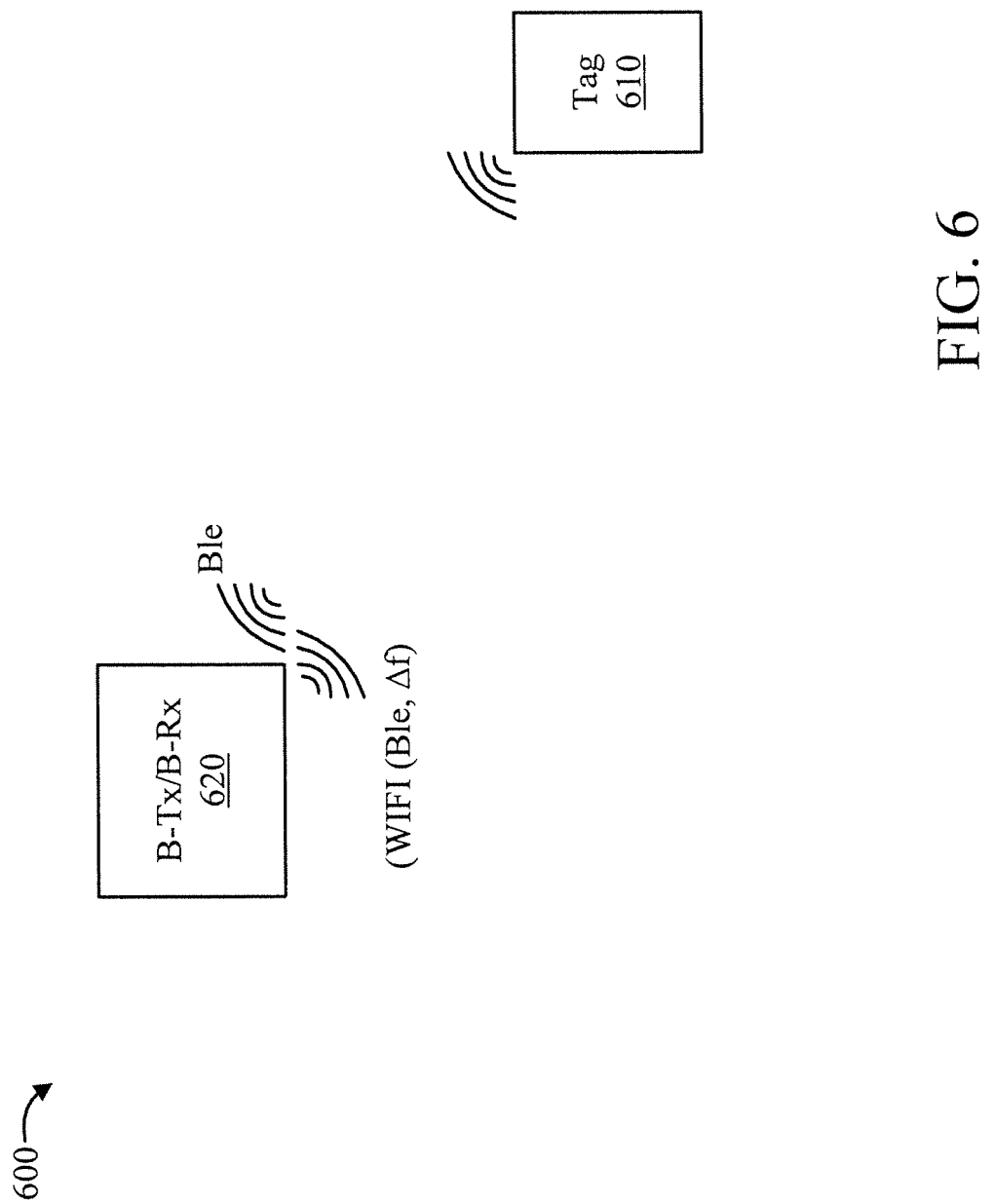
FIG. 6 is a block diagram showing an exemplary operation of the present invention involving a mono-static setup that uses a static device, in accordance with an embodiment of the present invention.

The present invention operates as shown in FIGS. 3-6. FIG. 3 is a block diagram showing an exemplary operation 300 of the present invention involving harmonic tags, in accordance with an embodiment of the present invention. In FIG. 3, a fixed frequency differential is used such that $\Delta f = k \cdot f_1$. The exemplary operation 300 is between a tag 310, a device 320 hosting B-Tx, and a device 330 hosting B-Rx. FIG. 4 is a block diagram showing an exemplary operation 400 of the present invention involving frequency-shifting tags, in accordance with an embodiment of the present invention. In FIG. 4, a flexible $\Delta f$ is used. The exemplary operation 400 is between a tag 410, a device 420 hosting B-Tx, and a device 430 hosting B-Rx. FIG. 5 is a block diagram showing an exemplary operation 500 of the present invention involving a mono-static setup that uses a mobile device, in accordance with an embodiment of the present invention. The exemplary operation 500 is between a tag 510 and a device 520 hosting B-Tx/B-Rx. FIG. 6 is a block diagram showing an exemplary operation 600 of the present invention involving a mono-static setup that uses a static device, in accordance with an embodiment of the present invention. The exemplary operation 600 is between a tag 610 and a device hosting B-Tx/B-Rx 620.

The devices hosting the B-Tx and B-Rx first communicate with each other (through an application) to coordinate a set of orthogonal channels (e.g. WIFI and/or Bluetooth channels) for transmission by B-Tx ($C_t$) and reception B-Rx ($C_r$), that will be employed in ambient, distributed backscatter. The B-Tx then illuminates the orthogonal-band tags on channel(s) $C_t$; the tags respond back on either channels $C_t$ and $C_r$ (dual-band tags) or just $C_r$ (frequency-shifting tags), which is then picked up by B-Rx on channel $C_r$. B-Rx then relays the tag's response back to B-Tx, which records, and maintains an inventory of tags read in the environment.

In a single phase backscattering protocol, the tag will perform a random back-off (to alleviate collisions with other tags) before backscattering its information. To be able to work with off-the-shelf WIFI and Bluetooth devices in the environment as B-Tx and B-Rx, the tags will encode information at the granularity of WIFI/Bluetooth packets, and the presence/absence of these packets will directly convey the tag's response to B-Rx in a single phase. If two phase protocols need to be employed between reader and tags, then B-Tx and B-Rx will coordinate closely to perform a lock-step execution of the two phases—the B-Tx will illuminate all the tags, the response from the tags is then received and relayed from B-Rx to B-Tx; B-Tx then polls a specific tag in phase 2, whose response at B-Rx is again relayed back to B-Tx.

Note that the B-Tx and B-Rx in our set-up could be a WIFI router and a smartphone, or a voice-activated device such as Amazon Echo® or Google Home® and a smartphone, or two smartphones, etc. The ability to leverage such existing devices adds diversity to the system without the need for additional readers. For example, when a user carrying a smartphone walks about the room, this increases the reliability of the tag reads by reading it from multiple different positions.

A description will now be given regarding dual-band tags for harmonic frequency shift, in accordance with one or more embodiments of the present invention.

The dual band tag is designed to backscatter simultaneously on two wireless (e.g. WIFI/Bluetooth) channels. The present invention can accomplish this with the help of harmonic tags that leverage the inherent non-linear characteristics of the chip in the tag to generate backscattering at fundamental and harmonic frequencies simultaneously (typically first and second harmonics are the relatively stronger ones in terms of signal strength). The harmonic frequencies can be used as the dual channel ($C_r = f_3$) for the B-Rx to receive the backscattered signal without having to suppress interference from B-Tx on the fundamental frequency ($C_t = f_1$). This is illustrated in FIG. 3. A tuning circuit can be added to the antenna to amplify the backscattered signal at the desired harmonic frequency.

A limitation of such harmonic tags is that f3 has to be an integer multiple of $f_1$, i.e., $\Delta f = f_3 - f_1 = k \cdot f_1$, $k \in z^{1+}$.

Hence, there is not much flexibility in the choice of the orthogonal transmission and reception channels, which could affect the ability to leverage WIFI and Bluetooth channels on existing devices.

A description will now be given regarding frequency-shifting tags for arbitrary frequency shift, in accordance with an embodiment of the present invention.

To leverage existing smart devices and use their WIFI and Bluetooth channels flexibly, we need to enable arbitrary frequency shifts with our tags. To create such an arbitrary shift ($\Delta f$) of the reception channel from the transmission channel, while still keeping the tag completely passive, the present invention moves the associated complexity to the transmitter. In this case, B-Tx and B-Rx first coordinate the use of three channels for backscattering (instead of two in the case of dual-band tags), two for transmission $C_t = \{f_1, f_2\}$ and one for reception $C_r = f_3$, such that $f_2 - f_1 = f_3 - f_2 = \Delta f$. When B-Tx transmits on two channels $f_1$ and $f_2$ simultaneously, the frequency-shifting tag employs a passive mixer to generate frequencies of $f_2 + f_1$ and $f_2 - f_1$. The latter, $\Delta f$ is then used to (frequency shift) backscatter the signal from $f_2$ to $f_3 = f_2 + \Delta f$. B-Rx, which is tuned to f3 then receives the backscattered signal. This is illustrated in FIG. 4.

For example, if $\Delta f = 25$ MHz, then we can use two WIFI devices in 2.4 GHz, with two adjacent (orthogonal) channels being used at B-Tx (say channel 1 and 6) and the third adjacent one at B-Rx (say channel 11) to read these tags in consumer spaces. If one cannot deploy two WIFI channels simultaneously (dual radio) at B-Tx, then one of these channels may be substituted with a Bluetooth channel, which is available alongside WIFI in most smart devices today.

A noteworthy aspect of our orthogonal-band tag designs is that they are completely passive. They do not require the use of active components like additional oscillators and impedance-switching circuits to accomplish the frequency shift. Tag antenna designs in accordance with the present invention can be made to work with existing EPC Gen2 chips (two phase protocol) as well as other chips that enable a single phase protocol for use with off-the-shelf WIFI/Bluetooth devices.

The following is noted. While the B-Tx can employ WIFI and/or Bluetooth (called Ble hereafter) for both its TS and FS, the B-Rx can also employ WIFI and/or Bluetooth/Ble. In one specific instantiation, we realize the following set-up. The B-Rx is configured to receive a BS signal that is a Ble packet on a Ble advertisement channel ($f_2$). The B-Tx uses its WIFI interface to embed the desired Ble packet at $f_1$. In other words, the Ble packet's contents are generated in such a way that when appropriately embedded into the WIFI packet (i.e. altering the contents of WIFI packet), the resulting WIFI signal TS's frequency spectrum will have the Ble signal at $f_1$ embedded in it. The B-Tx uses another WIFI interface to embed the two carrier tones, separated by $\Delta f$ so as to generate the FS signal. The contents of this WIFI packet are determined such that its frequency spectrum has two carrier tones separated by $\Delta f$. The two WIFI interfaces are coordinated to generate the TS and FS signals simultaneously. The tag then backscatters the Ble signal at $f_1$ to $f_1 \pm \Delta f$ to allow the B-Rx to receive the Ble packet at $f_2$.

A description will now be given regarding locating objects, in accordance with one or more embodiments of the present invention.

While the previous sections discussed how to tag and monitor (read) various objects in indoor spaces, the present invention is also readily equipped to localize the object that is being read. Recall that the present invention can leverage distributed backscattering, where a potentially mobile device like a smartphone can serve as the B-Tx or B-Rx. The mobility of the smartphone increases the diversity and hence reliability of reading the tags by allowing it to get in proximity of the tags. Hence, if the smartphone can be localized when it is reading a tag, then the location of the tag can be approximately inferred from the location of the smartphone itself. The present invention leverages this observation of help locate the tags and hence keep track of where the various tagged products and objects are in the indoor space.

Localization of the smartphone can be accomplished in one of several ways.

(i) One could localize the phone acoustically with the help of the other device involved in backscattering, namely a voice-activated smart device (e.g. Amazon Echo®, Google Home®, etc.). Both the B-Tx and B-Rx have access to a microphone as well as a speaker, with the voice-activated device having a microphone array. One could leverage the array to localize the phone using conventional techniques like TDOA (Time Difference Of Arrival).

(ii) Another approach is to leverage multiple, static WIFI devices like smart TVs, voice-activated wireless hubs, access points, etc. in the indoor space to multi-literate and localize the smartphone.

A description will now be given regarding other aspects of the present invention, in accordance with one or more embodiments of the present invention.

Recall that the present invention can be used for tagging objects in indoor spaces using existing wireless infrastructure and eliminating the need for the deployment of any additional infrastructure such as RFID. While the B-Tx and B-Rx in the present invention are chosen to be two separate smart devices (e.g. Amazon Echo®, Google Home®, smartphones, etc.), they can also be co-located in the same smart device (illustrated in FIGS. 5 and 6). In the case of latter, they would use their existing radios to enable ambient, orthogonal-band backscattering but still wouldn't require the need for RFID and its self-interference cancelation.

If one is open to deploying a RF infrastructure in indoor spaces, either standalone or being integrated into existing smart devices, then one can directly leverage mono-static backscattering on the same device to tag indoor objects. Note that this requires a new wireless technology to be integrated into existing devices or a new device to be deploy, both of which add to cost. Further, being mono-static in nature (i.e., on a single static device), its ability to reliably read all the tags in the environment could be significantly limited.

Figure 7:
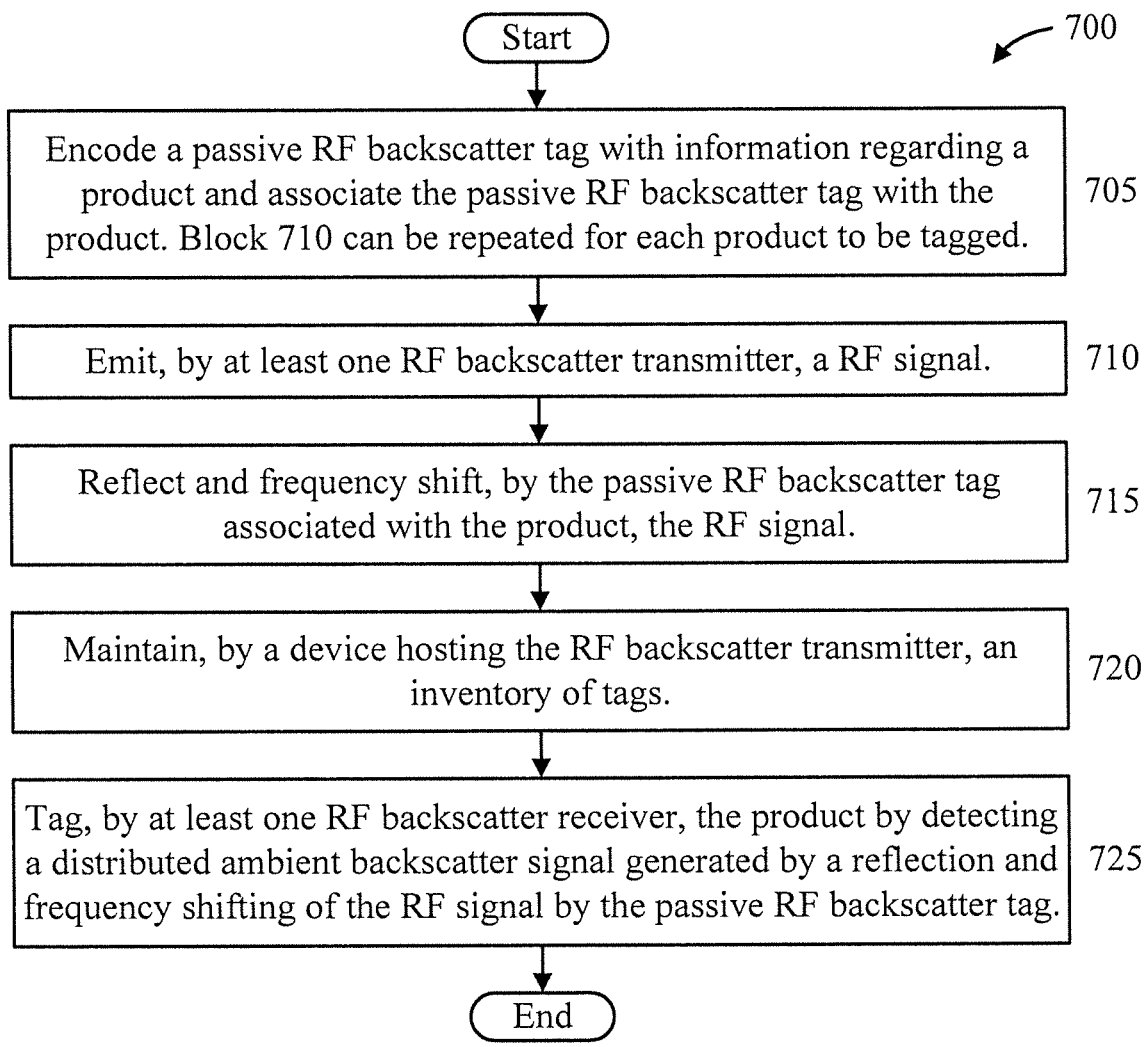
FIG. 7 is a flow diagram showing an exemplary method for tagging objects in indoor spaces using ambient, distributed backscatter, in accordance with an embodiment of the present invention.

FIG. 7 is a flow diagram showing an exemplary method 700 for tagging objects in indoor spaces using ambient, distributed backscatter, in accordance with an embodiment of the present invention.

At block 705, encode a passive RF backscatter tag with information regarding a product and associate the passive RF backscatter tag with the product. Block 710 can be repeated for each product to be tagged.

At block 710, emit, by at least one RF backscatter transmitter, a RF signal.

At block 715, reflect and frequency shift, by the passive RF backscatter tag associated with the product, the RF signal.

At block 720, maintain, by a device hosting the RF backscatter transmitter, an inventory of tags.

At block 725, tag, by at least one RF backscatter receiver, the product by detecting a distributed ambient backscatter signal generated by a reflection and a frequency shifting of the RF signal by the passive RF backscatter tag. In an embodiment, the RF signal can be orthogonal to the distributed ambient backscatter signal.

A description will now be given regarding consumer-deployed tags in consumer spaces, in accordance with one or more embodiments of the present invention.

The ability to tag and monitor objects in indoor spaces is useful for the consumer (user) to understand and subsequently optimize their usage. The user can procure the tags directly and attach them to objects that are deemed important (e.g. passports, wallets, etc.) or those that the user would like to track and monitor for usage and inventory (e.g. food, stationary and cleaning products). As the user walks around the space, the ambient, distributed backscattering technology, deployed through an application on the user's smart device (that accesses its' WIFI and Bluetooth wireless interfaces) will read the tags in the vicinity and hence their associated products.

Given that the tags are static, as the user moves around, he can use the diversity of his positions and backscatter readings from the same tag to localize the tag with respect to the smart device. This will in turn locate the objects that are tagged in the environment. To translate the tag/product location from relative (to smart device that is moving) to absolute coordinates, one can leverage other static wireless devices in the environment, such as a wireless access point and/or a voice-activate smart speaker (e.g. Amazon Echo®, Google Home®, etc.). The static wireless device(s) will localize the user's smart device, while the latter localizes the tag, thereby allowing the user to locate the tagged products with respect to the location of the static wireless device(s). This would allow the user to create an inventory as well as a blue-print of where different products are located in the consumer space. The localization of the user's smart device can be accomplished acoustically if a static voice-activated smart device is leveraged. The latter, having access to a microphone array and speaker, can leverage the array to localize the user's smart device using conventional techniques like TDOA (time difference of arrival). Another approach is to leverage WIFI from multiple, static devices (e.g., smart TVs, voice-activated wireless hubs, access points, etc.) to multi-literate and localize the smartphone.

Such a tracking and inventory feature provides several benefits to the consumer. Some exemplary scenarios include: (i) the user can readily access the inventory of products in his home, when he is shopping in a store; (ii) an application can remind the user at a configured frequency that a particular product(s) is out of stock at home and needs to be re-stocked; (iii) the user can identify mis-placed objects around the indoor space (e.g., based on the backscatter signal and a map of proper product locations).

Figure 8:
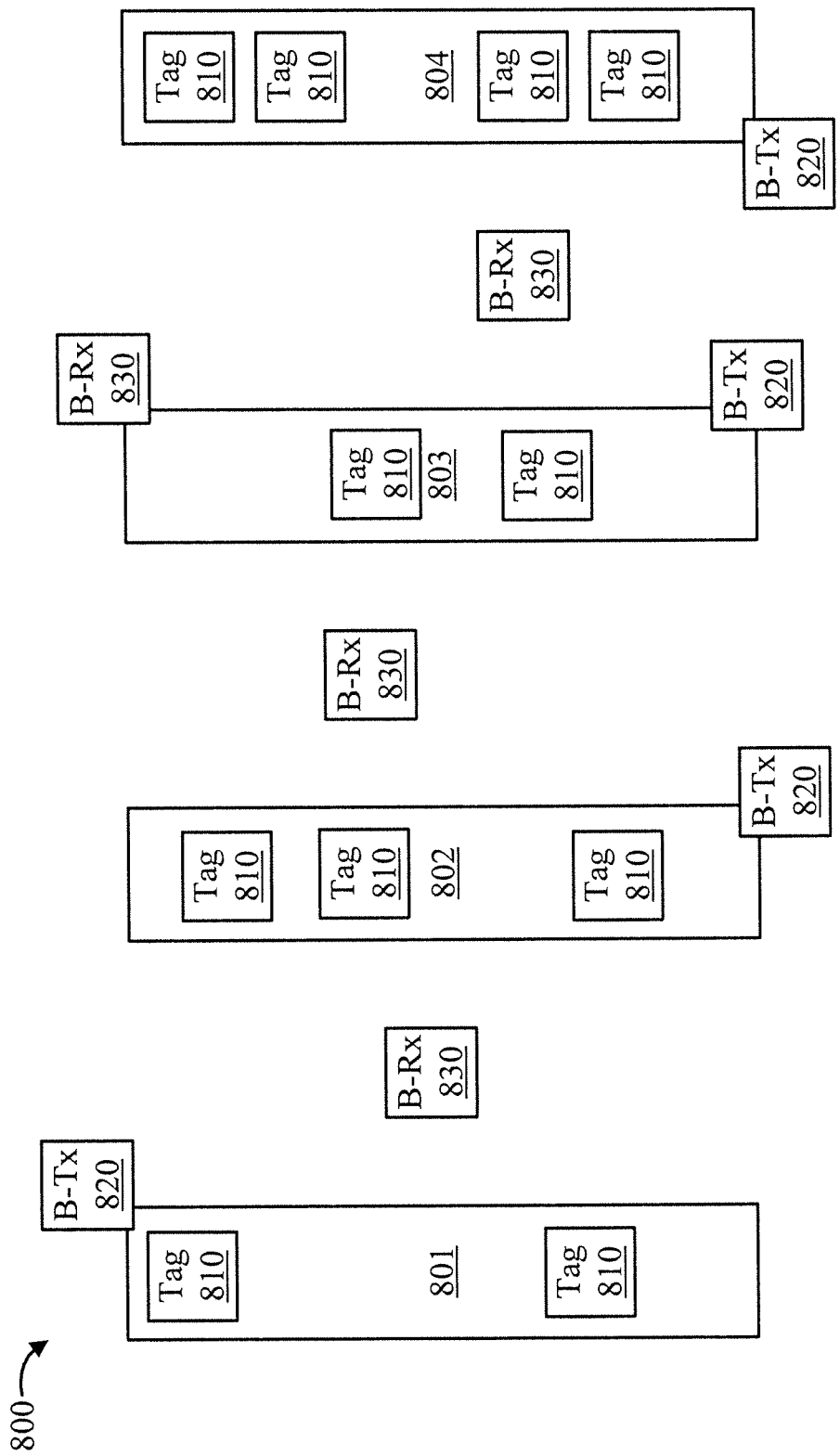
FIG. 8 is a block diagram showing an exemplary store environment to which the present invention can be applied, in accordance with an embodiment of the present invention.

FIG. 8 is a block diagram showing an exemplary store environment 800 to which the present invention can be applied, in accordance with an embodiment of the present invention.

The environment 800 includes a multiple aisles 801-804, each having one or more B-Tx's and one or more R-Tx's, e.g., one a per aisle or per area basis, in order to tag objects on the shelves of the aisles.

Tags 810 can be read by B-Rx's 820 after being tagged by B-Tx's 810. At least some of the B-Tx's 820 and B-Rx's 830 are comprised in user devices of users and/or employees walking through the aisles. The users and/or employees can receive messages via their devices (e.g., phones) regarding information associated with items tagged by a user. In this way, various aspects of the present invention, such as inventory control, product misplacement, couponing, and so forth can be achieved.

Figure 9:
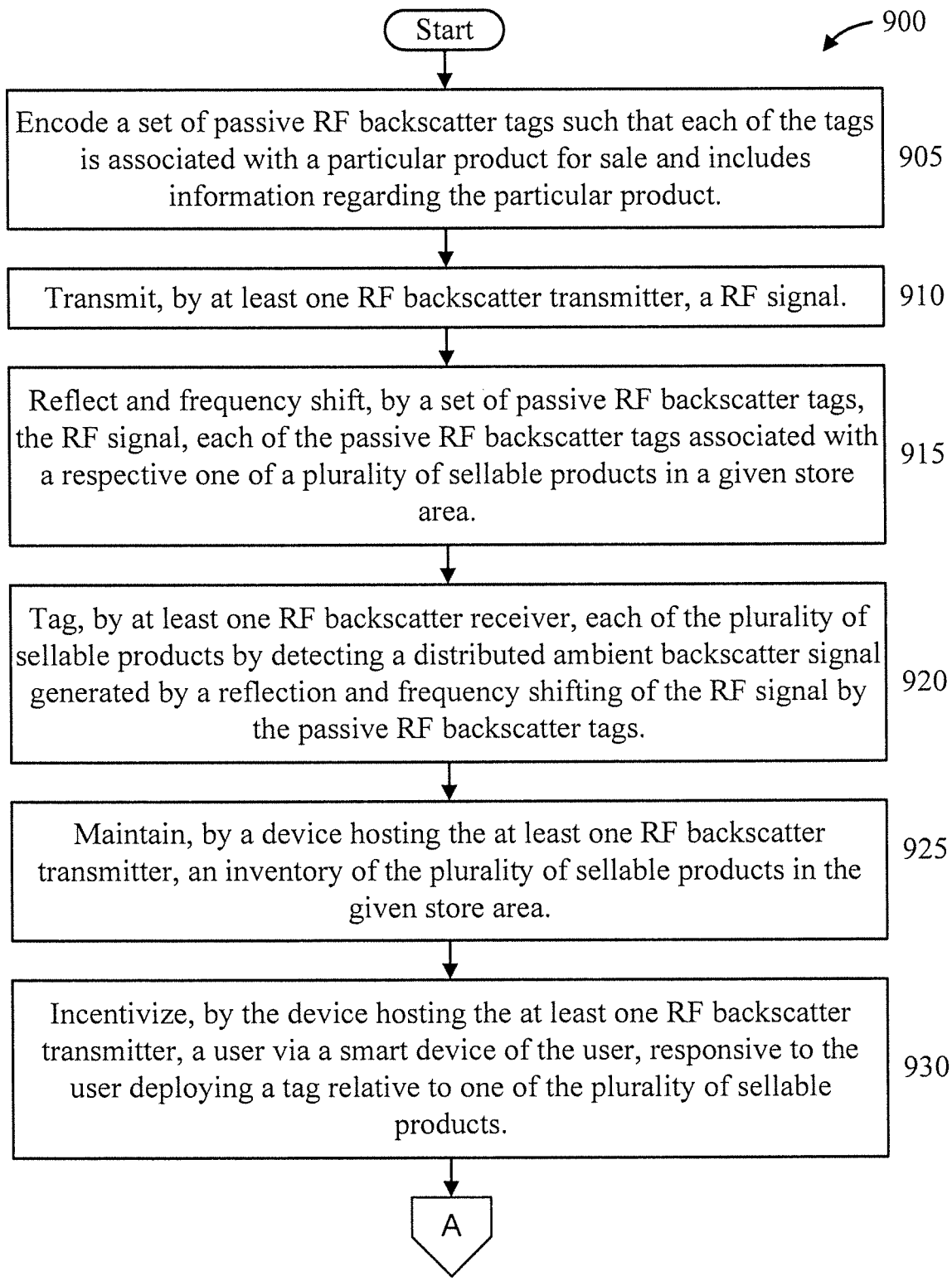
FIGS. 9-10 are flow diagrams showing an exemplary method for maintaining an in-store inventory, in accordance with an embodiment of the present invention.
Figure 10:
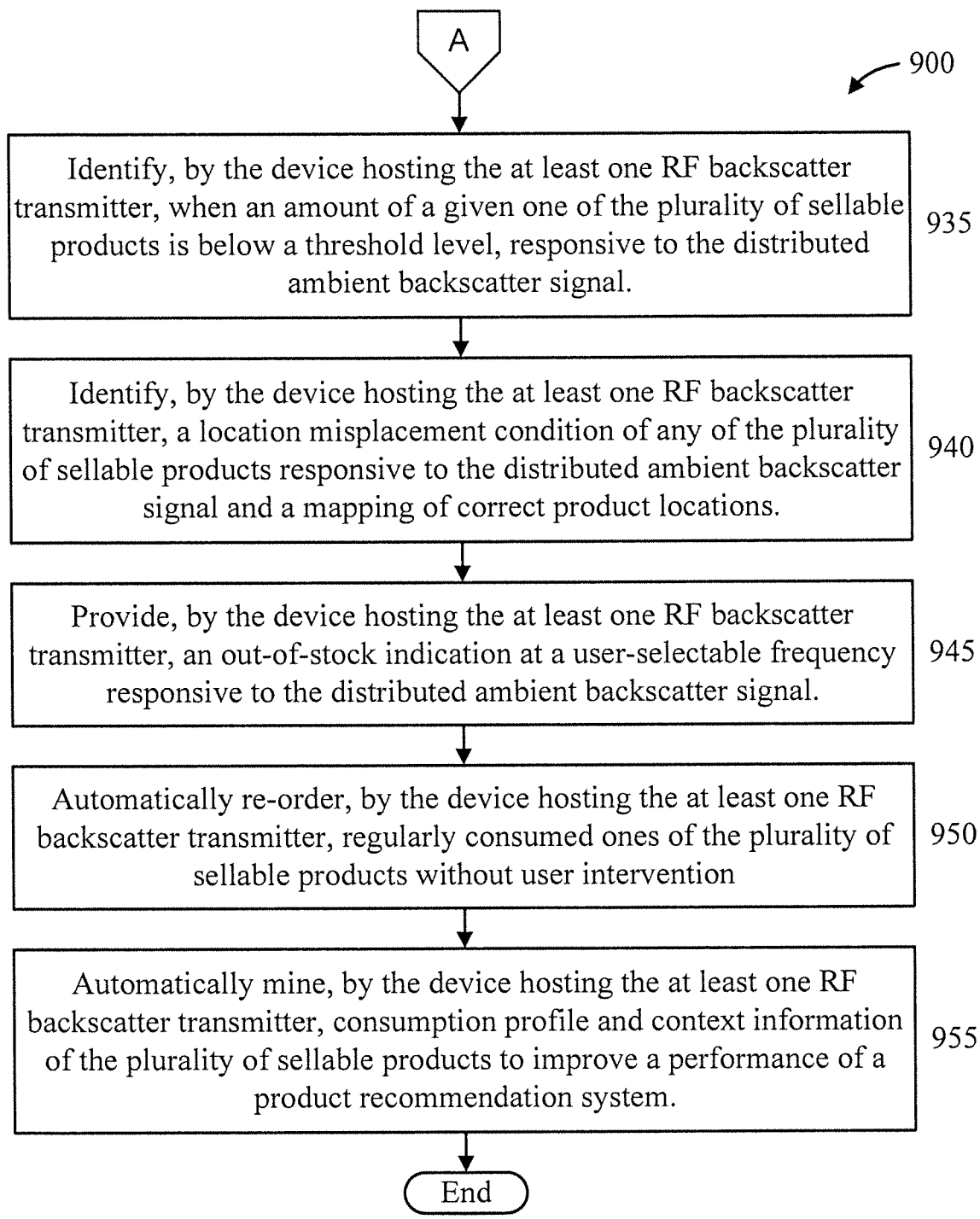

FIGS. 9-10 are flow diagrams showing an exemplary method 900 for maintaining an in-store inventory, in accordance with an embodiment of the present invention.

At block 905, encode a set of passive RF backscatter tags such that each of the tags is associated with a particular product for sale and includes information regarding the particular product.

At block 910, transmit, by at least one RF backscatter transmitter, a RF signal.

At block 915, reflect and frequency shift, by a set of passive RF backscatter tags, the RF signal, each of the passive RF backscatter tags associated with a respective one of a plurality of sellable products in a given store area.

At block 920, tag, by at least one RF backscatter receiver, each of the plurality of sellable products by detecting a distributed ambient backscatter signal generated by a reflection and a frequency shifting of the RF signal by the passive RF backscatter tags.

At block 925, maintain, by a device hosting the at least one RF backscatter transmitter, an inventory of the plurality of sellable products in the given store area.

At block 930, incentivize, by the device hosting the at least one RF backscatter transmitter, a user via a smart device of the user, responsive to the user deploying a tag relative to one of the plurality of sellable products.

At block 935, identify, by the device hosting the at least one RF backscatter transmitter, when an amount of a given one of the plurality of sellable products is below a threshold level, responsive to the distributed ambient backscatter signal.

At block 940, identify, by the device hosting the at least one RF backscatter transmitter, a location misplacement condition of any of the plurality of sellable products responsive to the distributed ambient backscatter signal and a mapping of correct product locations.

At block 945, provide, by the device hosting the at least one RF backscatter transmitter, an out-of-stock indication at a user-selectable frequency responsive to the distributed ambient backscatter signal.

At block 950, automatically re-order, by the device hosting the at least one RF backscatter transmitter, regularly consumed ones of the plurality of sellable products without user intervention.

At block 955, automatically mine, by the device hosting the at least one RF backscatter transmitter, consumption profile and context information of the plurality of sellable products to improve a performance of a product recommendation system.

A description will now be given regarding retailer-deployed tags in consumer spaces, in accordance with an embodiment of the present invention.

The previous model provides complete freedom to consumers to determine which products they would like to tag and hence track/monitor. However, the information relating to the usage of such products and the shopping/consumption behavior of users, will not be available to the retailers. The availability of such information to the retailers will not only help them provide value-added shopping services to consumers based on analytics, but will also help them better design their personalized advertisements and marketing strategy, product delivery and selling processes, as well as inventory management.

For the retailer to derive insights into the consumption of products in consumer space, the retailer needs to influence the tagging of products either directly or indirectly. Either the retailer can tag the products directly at the warehouse or distribution center, or indirectly incentivize (via coupons, discounts, rewards, etc.) the user (e.g., via an application on a user device (e.g., a smart phone)) to tag products once they are in the consumer space. However, the application needed to enable and use ambient backscattering for reading the tags will be provided by the retailer, thereby giving the retailer access to product information and their consumption in indoor spaces. The application can run directly on the consumer's smart device, which serves as both the B-Tx and B-Rx. Alternatively, the retailer (such as Amazon®, Google® or Apple®) can use their voice-activated smart devices (such as Echo, Home, etc.) as both the B-Tx and B-Rx; or use their static device as just the B-Tx, while the user's mobile device serves as the B-Rx; or use both the static and user devices as B-Tx, while user device serves as B-Rx. In the set-ups, where both static and user devices are involved, the application will run on both the B-Tx and B-Rx in a coordinated manner. In addition to reading of tags/products, the retailers can also track the location of the products, thereby providing contextual information, as in the previous use case.

Such product tracking and monitoring information can be integrated with the retailers' e-commerce systems to enable several features: (i) automate re-ordering of regularly consumed products as appropriate without user intervention; (ii) incentivize and influence shopping behavior of users through personalized coupons; (iii) mine consumption profile and context information (e.g., location) of products to build better recommender systems that can provide personalized suggestions for products in other related categories (based on context and wide-spread data from several customers); etc.

A description will now be given regarding retailer-deployed tags in retail spaces, in accordance with one or more embodiments of the present invention.

Similar to consumer spaces, the retailer can realize the ambient backscatter technology directly in retail spaces/stores. The retailer would deploy his static wireless devices as B-Tx and tag the products in the store, while the users mobile devices will serve as the B-Rx. Instead of the users interacting with objects in their homes and consumer spaces as in the previous use-case, they will now interact directly with products in retail stores. The retailer can use this technology to not only track inventory of products in the store in real-time, but by allowing users to directly interact with the products, the retailer can get valuable insights into user shopping behavior that can used to influence their shopping decisions in real-time.

Such a feature delivers several benefits to the retailer: (i) enables real-time inventory of products in the store; (ii) capture real-time interaction of customers with products to influence buying decisions through targeted coupons, recommendations, etc.; (iii) better shopping experience for users by providing real-time assistance on interested products directly on their phones; etc.

A description will now be given regarding venue-deployed tags in commercial spaces, in accordance with one or more embodiments of the present invention.

Another interesting use case of this technology is their application in large venues, both indoor and outdoor, where they can be deployed to provide navigation assistance as well as location-based targeted information. The venue owner will deploy the B-Tx and the tags, while the users will bring their own smart devices that will serve as B-Rx and interact with the tags directly. Given the inexpensive nature of these tags, they can be deployed densely to serve as landmark beacons that can enable several applications: (i) navigation in large venues like theme parks, convention/event centers, hospitality centers, indoor or outdoor tourist attractions, etc.; and (ii) deliver location-specific information that could be useful to visitors in applications such as exhibit description in museums/zoos, landmark description in popular tourist spots, event information in different parts of an event center, etc.

Figure 11:
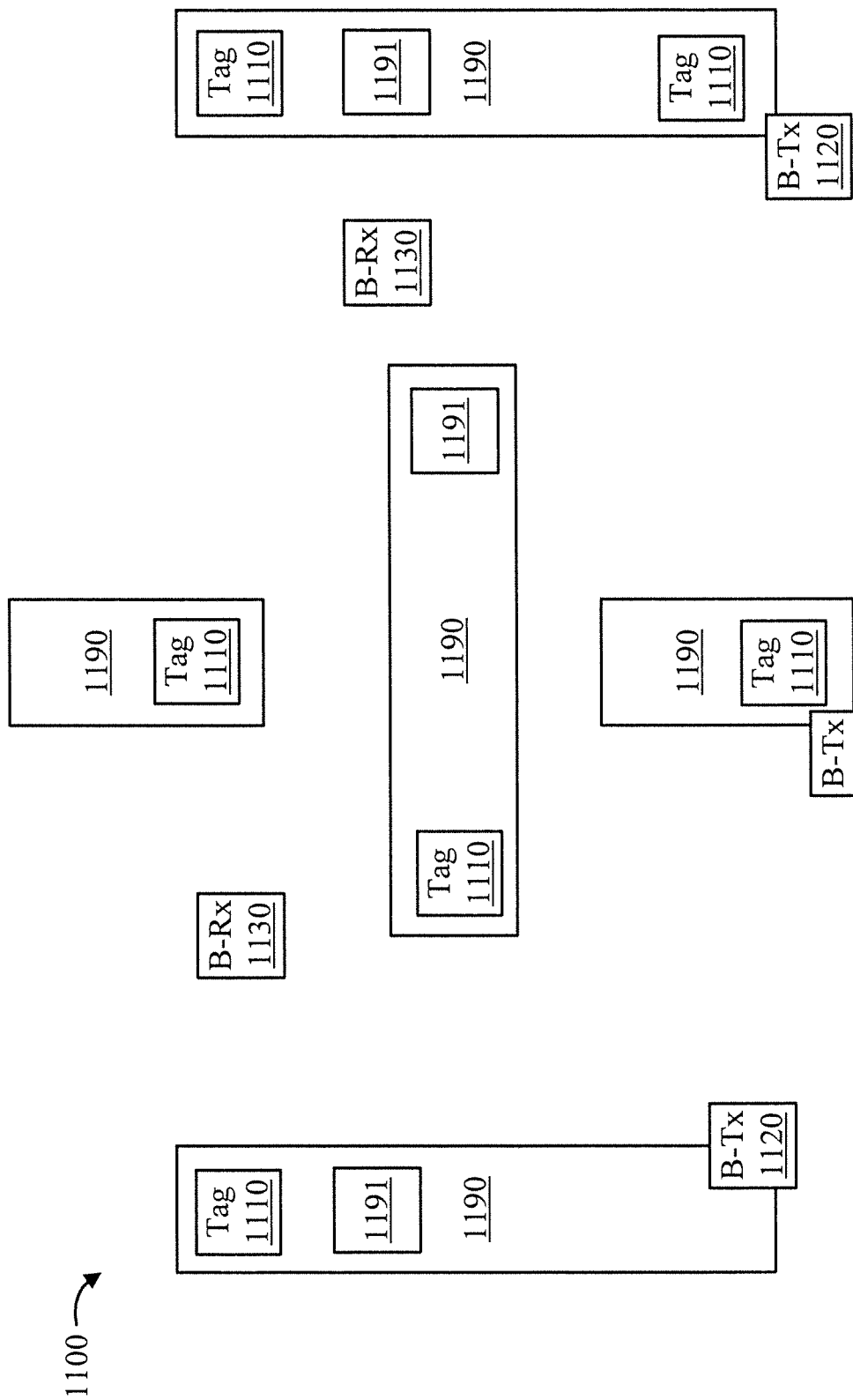
FIG. 11 is a block diagram showing an exemplary environment enabled with tagged navigation markers to which the present invention can be applied, in accordance with an embodiment of the present invention.

FIG. 11 is a block diagram showing an exemplary environment 1100 enabled with tagged navigation markers to which the present invention can be applied, in accordance with an embodiment of the present invention.

The navigation markers 1190 are fixed objects that can be used for navigation purposes. Passive RF backscatter tags 1110 are affixed to each of the navigation markers 1190 which can be tagged in order to receive information responsive to tagging.

At least one B-RX 1130 and at least one B-Tx 1120 are included in environment 1100, can be associated with the navigation makers and/or are associated with user devices (e.g., smart phones) of users. The navigation marker 1190 could have a speaker or display 1191 coupled to it that announces or shows navigation information to a user.

The benefits to venue owners (private or government) include (i) better user experience in navigating and exploring the venue; (ii) more efficient use of venue resources by better-informed customers; (iii) traffic analytics for venue owner to better restructure venue facilities and provision resources; and so forth.

Figure 12:
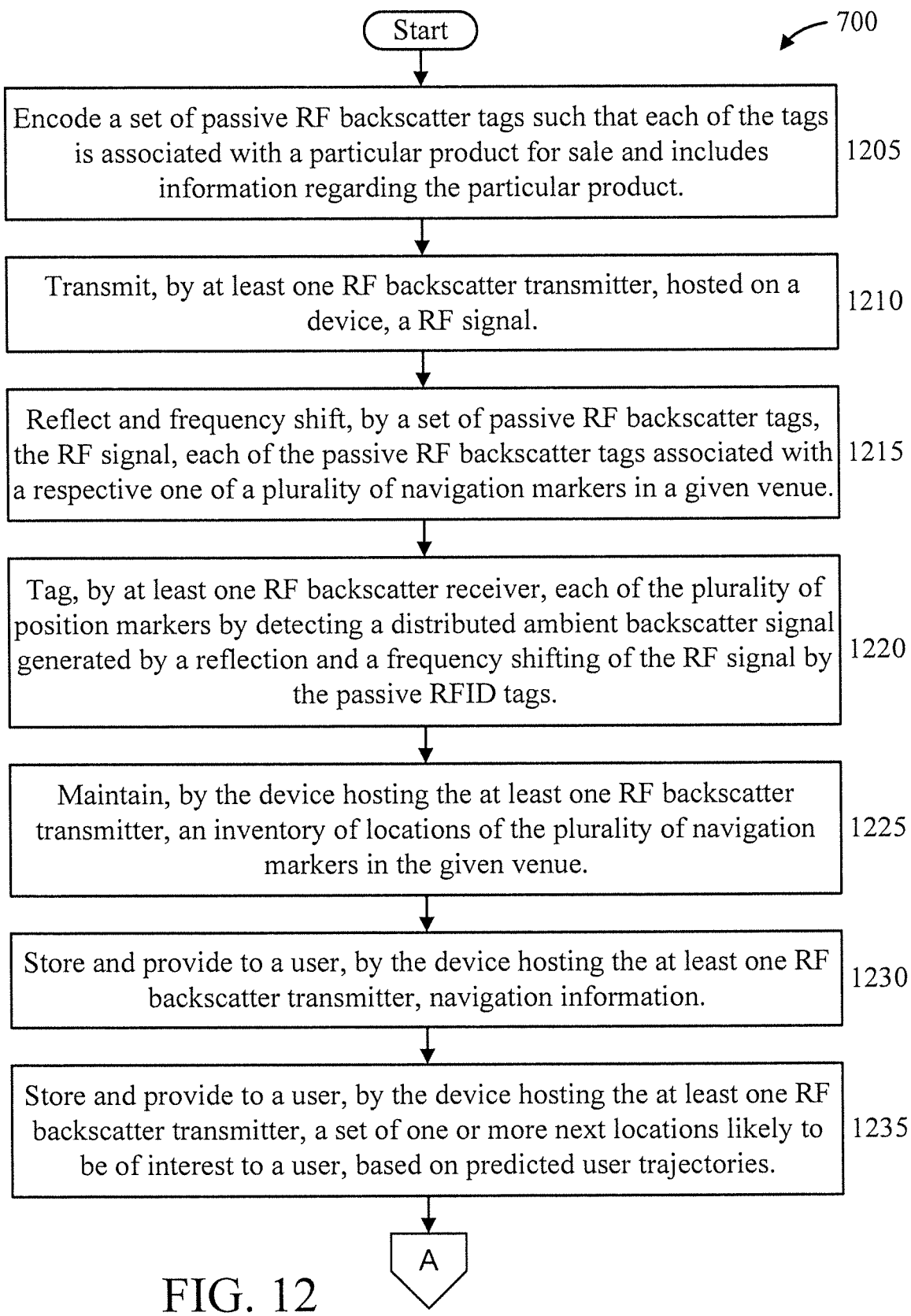
FIGS. 12-13 are flow diagrams showing an exemplary method for indoor navigation assistance, in accordance with an embodiment of the present invention.
Figure 13:
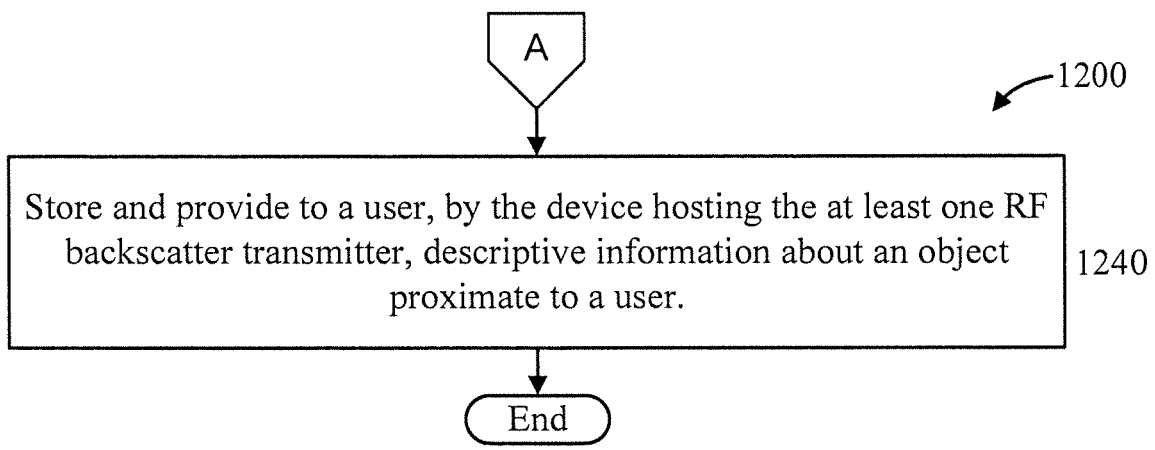

FIGS. 12-13 are flow diagrams showing an exemplary method 1200 for indoor navigation assistance, in accordance with an embodiment of the present invention.

At block 1205, encode a set of passive RF backscatter tags such that each of the tags is associated with a particular product for sale and includes information regarding the particular product.

At block 1210, transmit, by at least one RF backscatter transmitter, hosted on a device, a RF signal.

At block 1215, reflect and frequency shift, by a set of passive RF backscatter tags, the RF signal, each of the passive RF backscatter tags associated with a respective one of a plurality of navigation markers in a given venue.

At block 1220, tag, by at least one RF backscatter receiver, each of the plurality of position markers by detecting a distributed ambient backscatter signal generated by a reflection and frequency shifting of the RF signal by the passive RF backscatter tags.

At block 1225, maintain, by the device hosting the at least one RF backscatter transmitter, an inventory of locations of the plurality of navigation markers in the given venue.

At block 1230, store and provide to a user, by the device hosting the at least one RF backscatter transmitter, navigation information. In an embodiment, the navigation information is provided relative to user-observable ones of the navigation markers.

At block 1235, store and provide to a user, by the device hosting the at least one RF backscatter transmitter, a set of one or more next locations likely to be of interest to a user, based on predicted user trajectories.

At block 1240, store and provide to a user, by the device hosting the at least one RF backscatter transmitter, descriptive information about an object proximate to a user.

The information stored and provided to the user in the preceding blocks can be provided to the user in acoustic form or visual form.

A description will now be given regarding another embodiment of the present invention involving a twin carrier signal formed from two RF signals on two frequencies and a main carrier signal.

Figure 14:
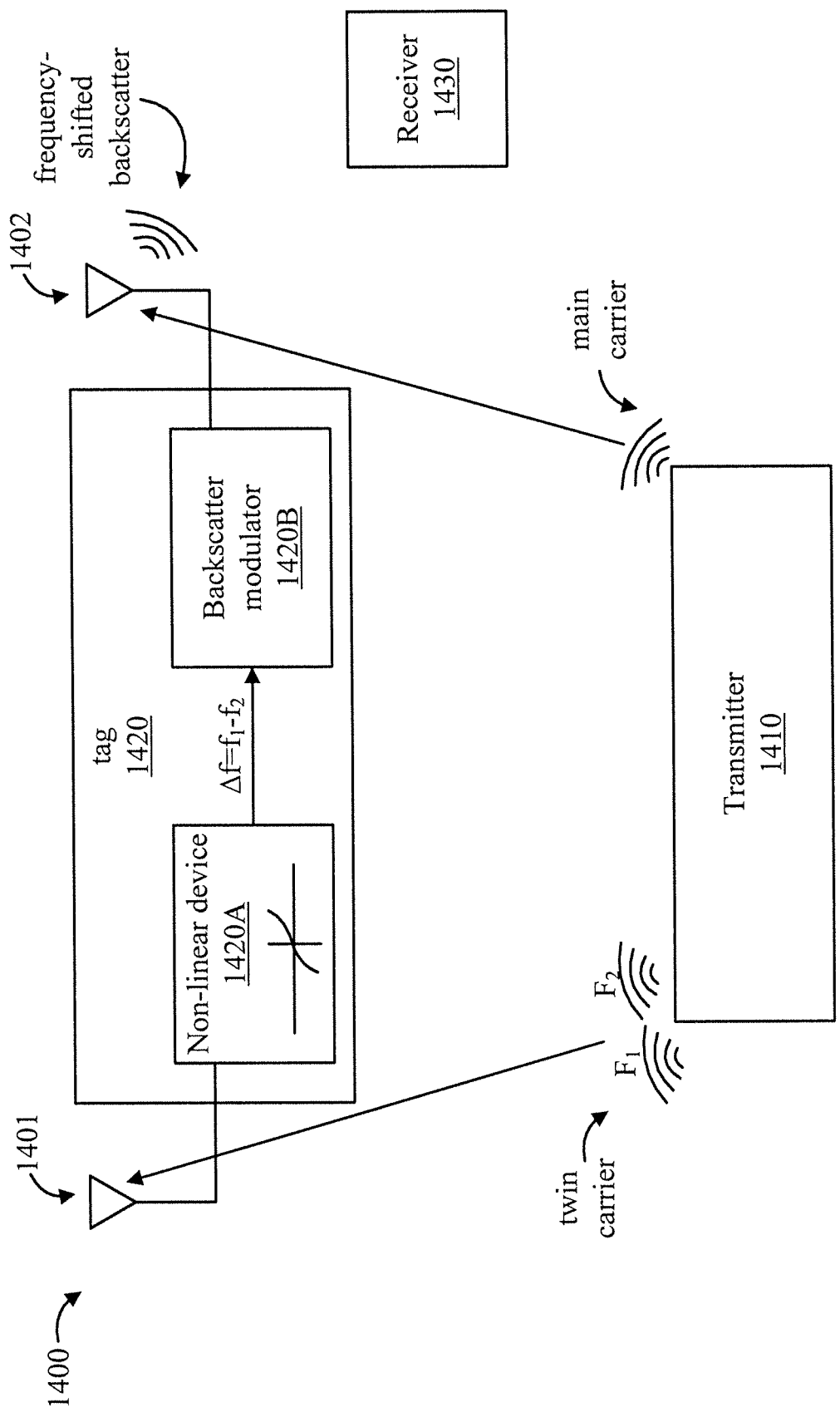
FIG. 14 is a block diagram showing an exemplary product tagging system 1400 to which the present invention can be applied, in accordance with an embodiment of the present invention.

FIG. 14 is a block diagram showing an exemplary product tagging system 1400 to which the present invention can be applied, in accordance with an embodiment of the present invention.

The system includes a RF backscatter transmitter 1410, a passive RF backscatter tag 1420, a RF backscatter receiver 1430, an antenna 1401 and an antenna 1402. The passive RF backscatter tag 1420 includes a non-linear device 1420A and a backscatter modulator 1420B.

The RF backscatter transmitter 1410 transmits a twin carrier RF signal (formed from the summation of two signals with frequencies $f_1$ and $f_2$) and a carrier signal.

In an embodiment, the RF backscatter receiver 1430 is a commodity device receiving the backscatter signal on one of its standard interfaces like WIFI, Bluetooth Low Energy (BLE), or Ultra-Wide Band (UWB). In an embodiment, the RF backscatter receiver 1430 coordinates the transmission of the main carrier signal and the twin-carrier signals from the RF backscatter transmitter 1410 through standardized wireless data scheduling mechanisms. In an embodiment, the RF backscatter receiver 1430 uses the trigger mode of uplink scheduling in WIFI OFDMA (Orthogonal Frequency Division Multiplexing Access) transmissions, to schedule the transmitter on at most two resource units for transmission of the main carrier and twin carrier signals.

In an embodiment, the RF backscatter transmitter 1410 is a commodity device sending the main carrier as well as the twin-carrier RF signals through one or more of its standard interfaces like WIFI, BLE, or UWB.

In an embodiment, the RF backscatter transmitter 1410 uses one of two carrier tones of the twin carrier RF signal as the main carrier RF signal or uses a separate carrier for the main carrier RF signal. In an embodiment, the RF backscatter transmitter 1410 includes one RF interface to generate both the main carrier and twin-carrier signals. In an embodiment, the at least one RF backscatter transmitter 1410 includes two RF interfaces, one of the two RF interfaces for generating the main carrier RF signal and another one of the two RF interfaces for generating the twin carrier RF signal. In an embodiment, reference signals from a resource unit of a standard wireless signal are leveraged by the RF backscatter transmitter 1410 to serve as the twin carrier RF signal. In an embodiment, the frequency spacing between the two RF signals forming the twin carrier signal is appropriately chosen to obtain the frequency shift at the backscatter tag 1420 that delivers the distributed ambient backscatter signal to the RF backscatter receiver 1430. In an embodiment, the main carrier signal and the twin carrier signal are embedded into a packet format of wireless interfaces and protocols used by the at least one RF backscatter transmitter 1410 for transmission. In an embodiment, embedded packet and twin carrier signal information is obtained through a processing of a cyclic prefix, an Inverse Fast Frequency Transform, a constellation mapping, a Low-Density Parity Check encoding and one or more scrambling mechanisms at the RF backscatter transmitter 1410 in reverse. In an embodiment, a packet format recognized by the at least one RF backscatter receiver 1430 is appropriately embedded into the packet format of an interface used by the RF backscatter transmitter 1410 for transmission.

In an embodiment, the passive RF backscatter tag 1420 uses passive non-linear elements along with the twin carrier signal from the RF backscatter transmitter 1410 to frequency shift the main carrier RF signal to the different frequency during a backscatter process. In an embodiment, the passive RF backscatter tag 1420 modulates information onto a frequency-shifted carrier for reception at the RF backscatter receiver 1430.

In an embodiment, the passive RF backscatter tag 1420 switches on or off a packet sent by the at least one RF backscatter transmitter 1410 to convey information on the frequency-shifted main carrier RF signal to the RF backscatter receiver 1430. In an embodiment, the passive RF backscatter tag 1420 encodes information on the frequency-shifted main carrier RF signal as a baseband signal conforming to a packet structure receivable by the RF backscatter receiver 1430 on an interface thereof.

Operation of the elements of system 1400 is further described below.

Figure 15:
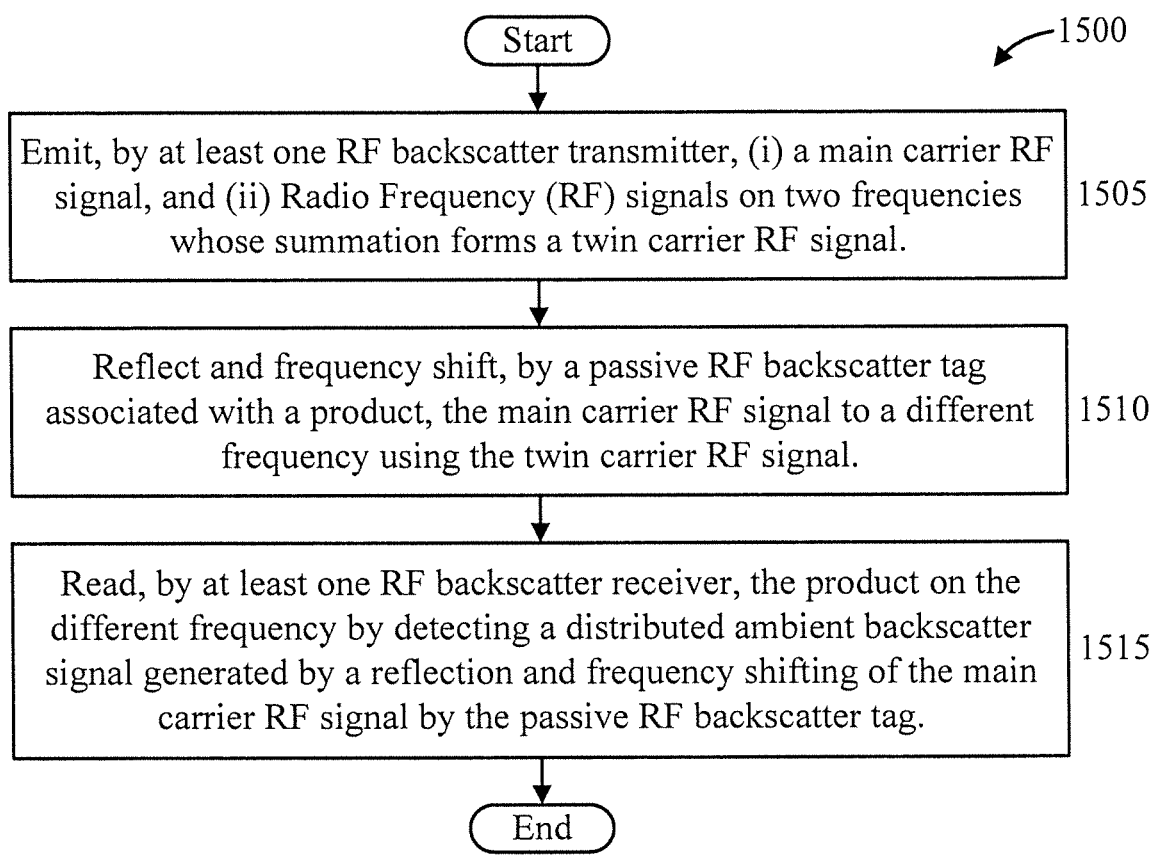
FIG. 15 is a flow diagram showing an exemplary product tagging method 1500 to which the present invention can be applied, in accordance with an embodiment of the present invention.

FIG. 15 is a flow diagram showing an exemplary product tagging method 1500 to which the present invention can be applied, in accordance with an embodiment of the present invention.

At block 1505, emit, by at least one RF backscatter transmitter, (i) a main carrier RF signal, and (ii) Radio Frequency (RF) signals on two frequencies whose summation forms a twin carrier RF signal.

At block 1510, reflect and frequency shift, by a passive RF backscatter tag associated with a product, the main carrier RF signal to a different frequency using the twin carrier RF signal.

At block 1515, read, by at least one RF backscatter receiver, the product on the different frequency by detecting a distributed ambient backscatter signal generated by a reflection and frequency shifting of the main carrier RF signal by the passive RF backscatter tag.

A further description will now be given regarding the elements and operation of system 1400, in accordance with one or more embodiments of the present invention.

Two main components of system 1400 are (1) the process of embedding the twin-carrier (Y(t)) and data carrier (X(t)) signals into the commodity radio transmitter; and (2) a tag that (a) leverages the twin-carrier signal to generate a desired delta signal of sufficient amplitude, and (b) manipulates the delta signal to backscatter the data carrier onto a channel that does not incur interference from the twin-carrier signal at the commodity receiver.

A description will now be given regarding the tag design, in accordance with one or more embodiments of the present invention.

Figure 16:
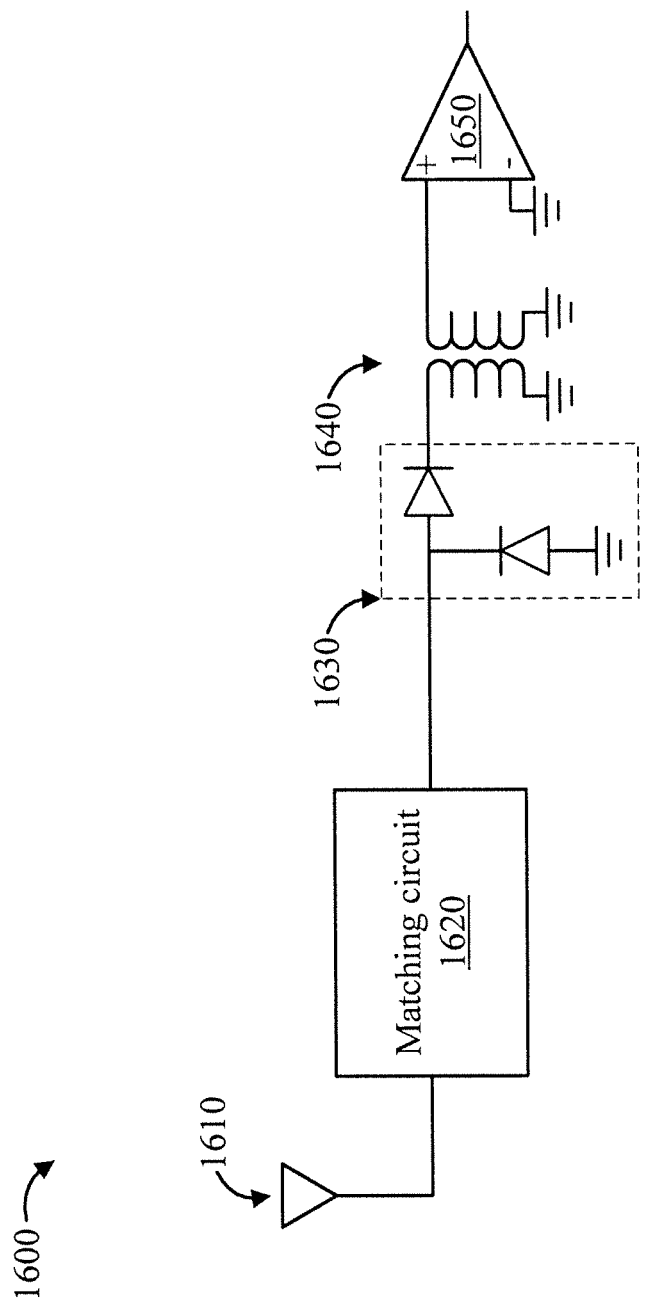
FIG. 16 is a flow diagram showing an exemplary delta generator 1600, in accordance with an embodiment of the present invention.

FIG. 16 is a flow diagram showing an exemplary delta generator 1600, in accordance with an embodiment of the present invention.

Following antenna 1610, we employ a matching circuit 1620 first to increase the tag's receive sensitivity, i.e., its ability to efficiently receive a signal or harvest energy at lower power. Our matching circuit 1620 include a series inductor followed by a shunt capacitor tuned for 2410 MHz (the frequency of the signal illuminating the tag). This allows us to boost its sensitivity from −5.3 dBm to −9.7 dBm, a 4.4 dB improvement, which is significant. The tuning values for the inductor and capacitor are 2.2 nH and 1.8 pF, respectively.

A description will now be given regarding a non-linear device, implemented by an envelope detector 1630.

A key step in the delta generation process is conversion of the twin-carrier signal to a sine wave with frequency $\Delta f$. Four different choices are available for converting the twin carrier to a sine wave. The choices are created using two simply passive non-linear devices, namely a mixer and a Schottky envelope detector: (1) passive mixer; (2) passive mixer followed by a 1:5 impedance transformer; (3) Schottky envelope detector; and (4) Schottky envelope detector 1630 followed by a 1:5 impedance transformer 1640. It is clear that the fourth design option has a strictly better performance than the other three, and is hence adopted in the design of system 1400. This is largely because the envelope detector 1630 has a much better performance than the mixer, while the use of the impedance transformer 1640 magnifies the amplitude by a factor of 5.

The transformer 1640 after the Schottky envelope detector 1630, which is a band-pass element around frequency $\Delta f$, not only helps magnify the amplitude of the produced sine wave, but also rules out the unwanted terms produced by the envelope detector—an important one being the persistent DC (zero-frequency) component that would otherwise overwhelm the signal components in the subsequent stages.

A description will now be given regarding a magnifier. The resulting sine wave might still not be strong enough (several mV amplitude at most) to directly drive the backscatter RF switch. Thus, we convert it to a full-swing square wave with frequency $\Delta f$ by a micro-power comparator 1650. The micro-power comparator 1650 is the only active component of our proposed delta generator circuit.

A description will now be given regarding delta signal manipulation. The twin carrier signal induces another delta signal with frequency equal to $\Delta f$ at the receiver 1430. This delta signal in turn produces an interfering signal at a frequency that is $\Delta f$ away from the frequency of the carrier signal. To bypass this frequency-shifted interference signal, the present invention halves the frequency of the delta signal generated inside the tag 1420, i.e., generates a square wave with a frequency equal to $$\frac{\Delta f}{2}.$$

Figure 18:
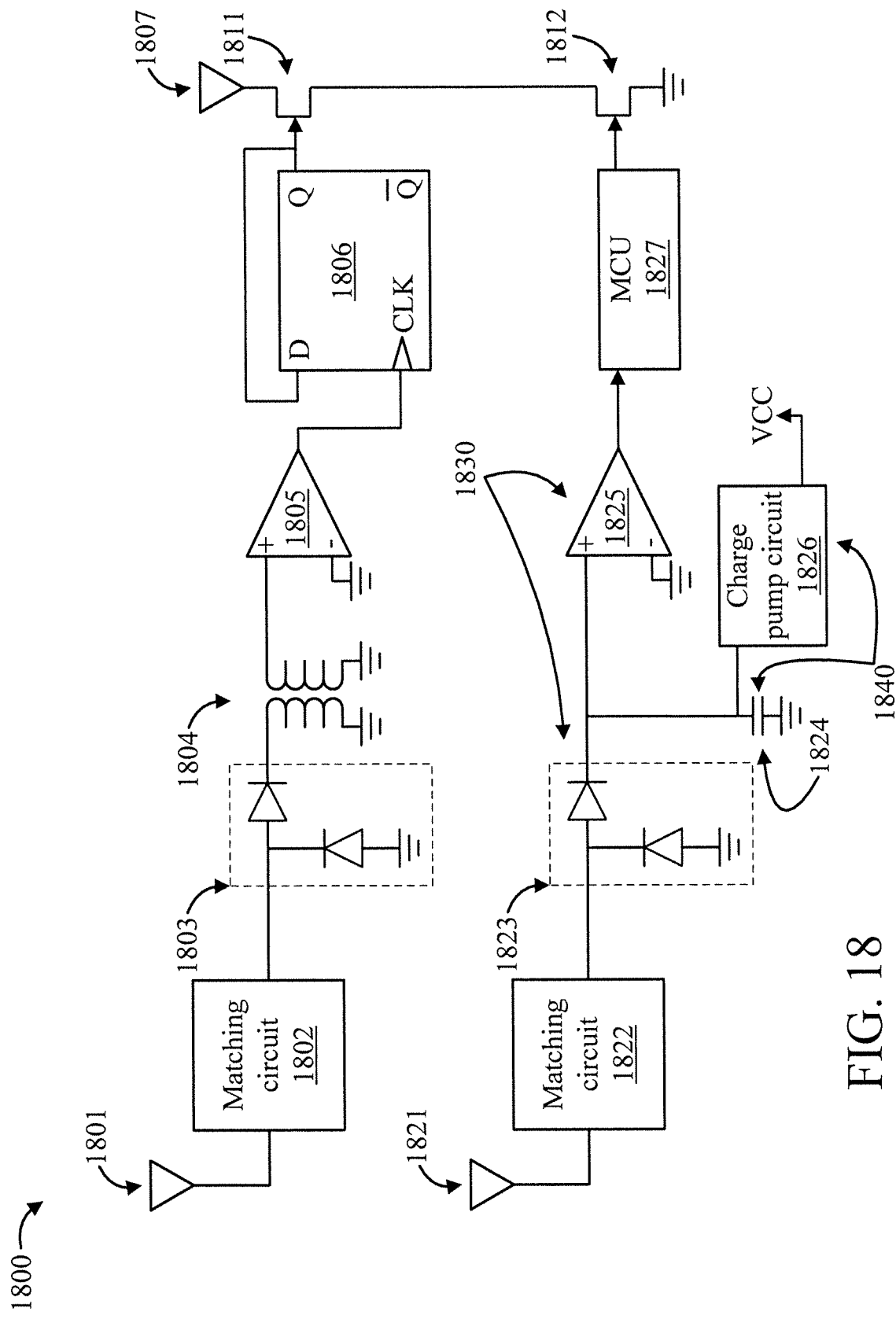
FIG. 18 is a block diagram showing an exemplary tag hardware configuration 1800, in accordance with an embodiment of the present invention.

This is accomplished using a low-power D-type flip-flop 1806 (see FIG. 18). The D input of the flip-flop 1806 is connected to its inverted Q-output ($\overline{Q}$) and the square wave output of the delta generator is made to serve as its clock. This results in dividing the frequency of the clock by two.

Dividing the frequency by two creates backscatter signals at $$\frac{\Delta f}{2}, \frac{3\Delta f}{2}, \frac{5\Delta f}{2}, \ldots$$

(referred to as fractional frequency shifts) away from the carrier signal, thereby allowing the receiver 1430 to bypass the internal interference by tuning into any of these channels. For a strong received signal, the preference is to tune the receiver to $$\frac{\Delta f}{2}$$

away from the carrier signal. However, $$\frac{\Delta f}{2}$$

is only 0.55 MHz away from the carrier signal and thus the backscatter would be highly masked by the carrier signal from the commodity transmitter 1410. For this reason, system 1400 opts to tune the receiver 1430 to the third harmonic of the backscatter, which is $$\frac{3}{2}\Delta f$$

away from the carrier signal even through the third harmonic is about 10 db weaker than the first harmonic.

A description will now be given regarding twin carrier embedding.

The description will commence with respect to leveraging WIFI's evolution to OFDMA. To illuminate the tag 1420 with the twin carrier signal, system 1400 creates a signal within the payload of a standard WIFI packet that resembles a twin carrier signal. WIFI standards in use today are based on OFDM and employ more than two pilot tones in each channel (e.g., 4 pilot tones in a 20 MHz 802.11ac channel). Given these pilots cannot be suppressed, this significantly restricts our capability in generating a clean twin carrier signal. However, system 1400 is able to leverage the latest opportunity presented by WIFIs evolution to OFDMA, namely 802.11ax. 802.11ax's OFDMA allows multiple users to share a single channel concurrently by dedicating different portions of the entire channel, called resource units (Rus), to them. The smallest size RU, which is a 26-tone 2.2 MHz sized RU, only has two pilot tones spaces about 1.1 MHz from each other. Thus, if we can shut down the rest (24) of the sub-carriers, i.e., the data sub-carriers, then the resulting signal would look like a twin carrier.

802.11ax ground rules will now be described. It is to be noted that the two pilot tones always exist at the $7^{th}$ and the $21^{st}$ sub-carriers of every 26-tone resource unit. This implies two things: first, we need to enforce low power symbols on all the sub-carriers other than the pilots (i.e., the data sub-carriers) so that the outcome can resemble a twin carrier (represented by two pilot tones). If we denote the target signal (twin carrier) by Y(t), then $$Y(t)=\alpha[\cos(2\pi f_1 t)+\cos(2\pi f_2 t)].$$

where $f_1$ and $f_2$ point to the locations of the two pilot tones within the resource unit of interest. Second, $\Delta f=f_1-f_2$ is not in our control and is specified by the frequency difference between the pilot tones, which is fixed at $21-7)\times 78.125$ kHz=1.09375 MHz (78.125 kHz is the bandwidth of every single sub-channel in 802.11ax); this specifies the value of $\Delta f$, for which the delta generator par of the tag hardware should be designed and optimized.

A description will now be given regarding system 1400 reverse engineers 802.11ax's pipeline to determine the appropriate payload bits that will generate the desired twin carrier waveform Y(t).

Figure 17:
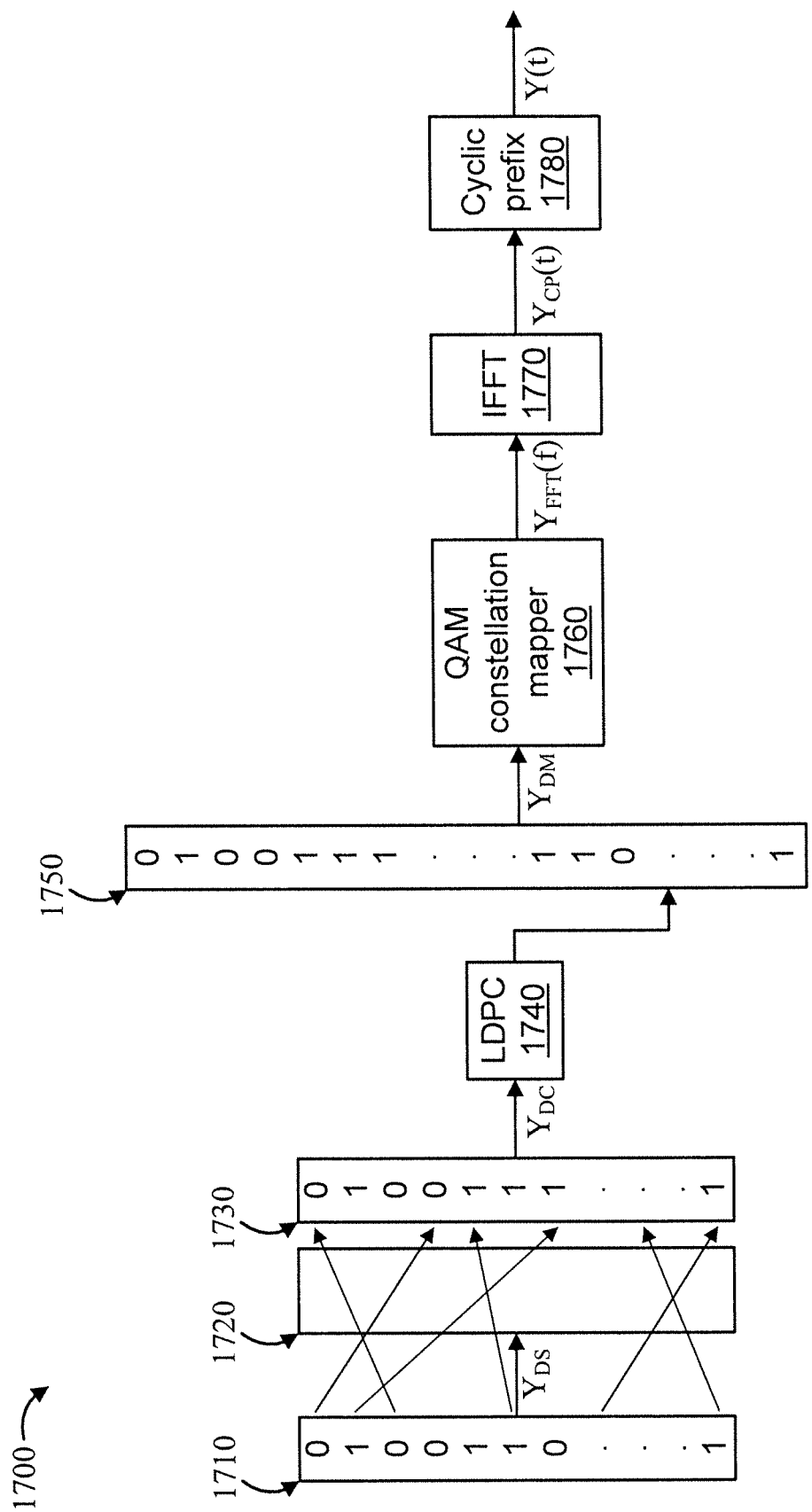
FIG. 17 is a block diagram showing an exemplary payload-to-waveform pipeline 1700 in a 802.11ax WIFI transmitter, in accordance with an embodiment of the present invention.

FIG. 17 is a block diagram showing an exemplary payload-to-waveform pipeline 1700 in a 802.11ax WIFI transmitter, in accordance with an embodiment of the present invention.

The pipeline 1700 includes a payload 1710, a scrambler 1720, a scrambled payload 1730, a LDPC encoder 1740, a QAM constellation mapper 1750, an Inverse Fast Fourier Transform (IFFT) 1770, and a cyclic prefix 1780.

A description will now be given regarding cyclic prefix inverse. The first step is to reverse engineer the cyclic prefix block, i.e., obtaining $Y_{CP}(t)$ and appending to its end. $Y_{CP}(t)$ is a 1×256 vector of I/Q samples and after cyclic prefix attachment, Y(t) would be a 1×272 vector of IQ samples to be modulated on top of the RF carrier.

We observe that the 8-th resource unit in channel 1 (2.402 GHz-2.422 GHz) is robust against the addition of cyclic prefix 1780. In other words, if $Y_{CP}(t)=\alpha[\cos(2\pi f_1 t)+\cos(2\pi f_2 t)]$, then $Y(t)\approx\alpha[\cos(2\pi f_1 t)+\cos(2\pi f_2 t)]$ as well. The reason is that the values (periods) of $f_1$ and $f_2$ in the 8-th RU are in harmony with the number of samples before and after the addition of cyclic prefix, so as to not introduce significant discontinuity to $Y_{CP}(t)$. Hence, system 1400 selects the 8-th RU for the twin carrier signal transmission and $Y_{CP}(t)=\alpha[\cos(2\pi f_1 t)+\cos(2\pi f_2 t)]$.

A description will now be given regarding a Fast Fourier Transform (FFT). We try to obtain $Y_{FFT}(f)$, the input of the IFFT block. Since FFT and IFFT are inverse mathematical functions, we can calculate $Y_{FFT}(f)$ by taking the FFT from the $Y_{CP}(t)=\text{IFFT}\{Y_{FFT}(f)\}$. However, we note that the IFFT generates a 1×256 time-domain I/Q vector from a 1×26 FFT-vector (24 for data sub-carriers and 2 for pilot tone sub-carriers of the 8-th RU). This is done by taking the IFFT over the whole 256 sub-carrier (20 MHz) channel with the assumption that remaining 256−26=230 sub-channels outside of the specified resource unit are null (0). We call this function and its inverse FFT' and IFFT', respectively. Thus, $Y_{FFT}(f)=\text{FFT}'\{Y_{CP}(t)\}$, where the FFT' calculation is no different from the FFT calculation for sub-channels of interest as follows:

$$Y_{FFT}(fm) = \sum_{n=1}^{256} Y_{CP}(n)e^{-j2\pi f_m n},$$

where $f_m$ is the frequency of the sub-carrier in the 8-th RU.

A description will now be given regarding QAM-1024 constellation de-map. Every QAM constellation point in 802.11ax is assigned to a data sub-carrier. In order to reverse engineer $Y_{DM}$ that results in the desired $Y_{FFT}(f)$, we should select the constellation points with the lowest energy for the data sub-carriers, whereas the two pilot tones toggle between +1+0j and −1+0j per OFDM symbol according to the pattern specified in the 802.11ax standard. We choose QAM-1024, the heaviest modulation scheme in 802.11ax, that translates every 10 bit to a constellation point, to minimize the amount of energy in the data sub-carriers. The power ratio between the pilot tones which take either $+1+0j$ or $-1+0j$ values and the data sub-carriers are maximized when the data sub-carriers take the constellation points with the lowest magnitude, or in other words the closest points to the Origin=$0+0j$. In QAM-1024, these points are $C_1$=0.03829+0.03829j, $C_2$=0.03829−0.03829j, $C_3$=−0.03829−0.03829j, and $C_4$=−0.03829+0.03829j. Thus, every 10-bit chunk of $Y_{DM}$ must translate to a word of the $\{C_1,C_2,C_3,C_4\}$ alphabet.

A description will now be given regarding LDPC decode. To that end, we reverse engineer $Y_{DC}$, the bit-vector at the input of the LDPC encoder that generates a $Y_{DM}$ with the aforementioned property. The LDPC encoder keeps the original chunk of input bits and attached parity bits to them. The LDPC matrix of 802.11ax has a code rate of ⅚; it takes 10000 bits of data and attaches a 2000-bit chunk of parity bits. So, $Y_{DC}$ looks like $[D_1,D_2, \ldots ,D_{100}]$ and $Y_{DM}$ looks like $[D_1,D_2, \ldots ,D_{100},P_1, \ldots ,P_{20}]$ where $D_i$'s are 1×10 chunks of data bits and $P_i$'s are 1×10 chunks of parity bits. $Y_{DC}$ is related to $Y_{DM}$ by the following:

$$Y_{DM}=Y_{DC} \cdot H,$$

where $H_{10000 \times 12000}$ is the binary encoding matrix of 802.11ax LDPC. However, directly finding the inverse of H is not straight-forward. Our strategy for resolving this issue is to first note that the desired $Y_{DM}$ is not unique and it has the requested property as long as each element of $Y_{DM}$ belongs to the alphabet $\{C_1,C_2,C_3,C_4\}$.

Therefore, LDPC's reverse engineering can be seen as the problem of finding a $Y_{DC}$ with all elements being in $\{C_1,C_2,C_3,C_4\}$. that produces a $Y_{DM}$ with all elements being in $\{C_1,C_2,C_3,C_4\}$. System 1400 conducts a randomized search in the space of all possible $Y_{DC}$ vectors, which has the cardinality of $4^{100}$.

A description will now be given regarding de-scrambling. We perform de-scrambling, i.e., the inverse of the scrambling at the beginning of the pipeline to find $Y_{DS}$. This is straight-forward given that the Scrambler in 802.11ax is a linear-feedback shift register (LFSR), with the initial state of the LFSR being an integer number from 1 to 127 for each packet.

A description will now be given regarding main carrier (BLE) embedding.

The description commences by describing the placing of the main carrier signal.

With the space between the tone carriers in 802.11ax being approximately 1.1 MHz, the backscatter signal needs to be shifted $$1.65 \text{ MHz} \left( = \frac{3}{2} \times 1.1 \text{ MHz} \right)$$

from the carrier signal. However, there are no two standard WIFI channels that are 1.65 MHz away from each other, preventing us from backscattering a WIFI packet. On the other hand, if we set the backscatter reader to be a Bluetooth low energy (BLE) receiver standing at the 2.402 GHz advertising channel, we can embed a signal resembling the waveform of a BLE advertising packet within the first resource unit that is 1.65 MHz shifted from the advertising channel. This signal is referred to as the BLE mirror, $M_{BLE}$ (t).

We first generate the baseband waveform of the BLE advertising packet by passing its bits through a 1 Mbps Gaussian Frequency Shift Keying (GFSK) modulator, as specified by Bluetooth Low Energy PHY layer. Then, we shift the frequency of the generated baseband signal so as to center it at 2.40365 GHz (=2.402 GHz+1.65 MHz). This gives us $M_{BLE}W$, which is then sampled at the sampling rate of the 20 MHz WIFI channel to obtain Y(t). This now forms the data signal, whose corresponding payload bits need to be reverse-engineered for placement in RU 1.

A description will now be given regarding reverse-engineering the embedded signal. The key challenge compared to twin-carrier embedding is that a whole BLE packet (not just two tones) needs to be embedded. At the WIFI sampling rate, the BLE signal now spans 25,600 bits, resulting in its partial overlap with the parity bits of the WIFI packet (even for the largest WIFI payload). With the parity bits being a function of the preceding data, these cannot be flexibly manipulated, causing the CRC check to fail, and hence the backscattered BLE packet to be discarded at the BLE receiver.

Towards addressing this challenge, we note that only the first 1120 samples of $M_{BLE}$ (t) (i.e. the first 7 bytes) of the BLE advertising packet ({preamble|access address|header}) are specified by the standard, and need to be perfectly reconstructed. For the rest of the samples, only the CRC checksum of the ultimate backscattered BLE advertising packet needs to pass at the BLE Rx. Hence, we take the first 1120 samples of Y(t) as $Y_1$(t) and perform the exact same reverse engineering described above on $Y_1$(t). The resulting reconstructed signal, $Y'_1$(t) now includes additional samples corresponding to the parity bits introduced in the pipeline.

After passing $Y'_1$(t) through the GFSK de-modulator, we get back the first seven bytes of the BLE advertising packet followed by the first part of the BLE MAC address. We take this part of the MAC address (less than 2 bytes) that is generated by the parity bits of the WIFI packet (i.e. cannot be changed), and add to it the rest of the MAC address bits, which can be arbitrarily chosen. Then, we add 24 bits of the CRC, pass it through the GFSK modulator and sample it with the WIFI channel's sampling rate to obtain $Y_2$ (t). Finally, we reverse engineer the payload bits corresponding to $Y_2$(t) as $Y'_2$(t) in the exact same procedure as described above. The overall reconstructed signal would be $Y'(t)=[Y'_1(t),Y'_2(t)]$. Note that, we can generate BLE advertising packets with various MAC addresses by choosing appropriate values for the MAC address in $Y_2$ (t).

Aside from the delta generator, the tag can include other hardware primitives for operation. These primitives altogether are shown in FIG. 18. FIG. 18 is a block diagram showing an exemplary tag hardware configuration 1800, in accordance with an embodiment of the present invention. We briefly explain the components not covered before. The tag hardware configuration 1800 includes an antenna 1801, an antenna 1821, and an antenna 1807. Other elements are described below. In an embodiment, antenna 1801 can receive a first signal of the twin carrier signal and the antenna 1821 can receive a second signal of the twin carrier signal. The antenna 1807 provides the RF backscatter signal.

A backscatter modulator includes two cascaded RF switches 1811, and 1812 between the backscatter antenna and the ground. The upside switch 1811 is fed by the output of the frequency divider for frequency shifting, while the downside switch 1812 is fed by the MCU 1827 for modulating bits of data on top of the FS-backscattered signal.

An ASK receiver 1830 is used for receiving downlink (reader-to-tag) messages. It uses a Schottky envelope detector 1823 followed by a very low power comparator 1825 to create the receiver.

Regarding an energy harvester 1840, the same Schottky envelope detector 1823 used by the ASK receiver 1830 is also used to charge a 2 μF energy-storage capacitor 1824 that triggers the input of a charge-pump circuit 1826. The input voltage threshold of the charge-pump circuit 1826 is 0.3 v, which means that every time the energy-storage capacitor 1824 is full, there is $CV^2=2$ µF×$(0.3V)^2$=0.18 µJ energy available for the tag hardware to consume.

These and other variations of the elements and operation of system 1400 are readily determined by one of ordinary skill in the art, given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A product tagging system, comprising:
    at least one RF backscatter transmitter configured to emit (i) a main carrier RF signal, and (ii) Radio Frequency (RF) signals on two frequencies whose summation forms a twin carrier RF signal;
    a passive RF backscatter tag associated with a product and configured to reflect and frequency shift the main carrier RF signal to a different frequency using the twin carrier RF signal; and
    at least one RF backscatter receiver configured to read the product on the different frequency by detecting a distributed ambient backscatter signal generated by a reflection and frequency shifting of the main carrier RF signal by the passive RF backscatter tag.

2. The product tagging system of claim 1, wherein the at least one RF backscatter transmitter is a commodity device sending the main carrier RF signal and the twin carrier RF signal through one or more interfaces thereof.

3. The product tagging system of claim 1, wherein the at least one RF backscatter receiver is a commodity device receiving the distributed ambient backscatter signal on an interface thereof.

4. The product tagging system of claim 3, wherein the at least one RF backscatter receiver coordinates transmissions of the main carrier RF signal and the twin-carrier signal from the at least one RF backscatter transmitter through wireless data scheduling mechanisms.

5. The product tagging system of claim 3, wherein the at least one RF backscatter receiver uses a trigger mode of uplink scheduling in WIFI Orthogonal Frequency Division Multiplexing Access transmissions to schedule the at least one RF backscatter transmitter on at most two resource units for transmission of the main carrier RF signal and the twin carrier RF signals.

6. The product tagging system of claim 1, wherein the at least one RF backscatter transmitter uses one of two carrier tones of the twin carrier RF signal as the main carrier RF signal or uses a separate carrier for the main carrier RF signal.

7. The product tagging system of claim 6, wherein the at least one RF backscatter transmitter comprises one RF interface to generate both the main carrier and twin-carrier signals.

8. The product tagging system of claim 6, wherein the at least one RF backscatter transmitter comprises two RF interfaces, one of the two RF interfaces for generating the main carrier RF signal and another one of the two RF interfaces for generating the twin carrier RF signal.

9. The product tagging system of claim 6, wherein reference signals from a resource unit of a standard wireless signal are leveraged by the at least one RF backscatter transmitter to serve as the twin carrier RF signal.

10. The product tagging system of claim 6, wherein the frequency spacing between the two RF signals forming the twin carrier signal is appropriately chosen to obtain the frequency shift at the backscatter tag that delivers the distributed ambient backscatter signal to the at least one RF backscatter receiver.

11. The product tagging system of claim 6, wherein the main carrier signal and the twin carrier signal are embedded into a packet format of wireless interfaces and protocols used by the at least one RF backscatter transmitter for transmission.

12. The product tagging system of claim 11, wherein embedded packet and twin carrier signal information is obtained through a processing of a cyclic prefix, an Inverse Fast Frequency Transform, a constellation mapping, a Low-Density Parity Check encoding and one or more scrambling mechanisms at the at least one RF backscatter transmitter in reverse.

13. The product tagging system of claim 6, wherein a packet format recognized by the at least one RF backscatter receiver is appropriately embedded into the packet format of an interface used by the at least one RF backscatter transmitter for transmission.

14. The product tagging system tagging system of claim 1, wherein the passive RF backscatter tag uses passive non-linear elements along with the twin carrier signal from the at least one RF backscatter transmitter to frequency shift the main carrier RF signal to the different frequency during a backscatter process.

15. The product tagging system tag of claim 14, wherein the passive RF backscatter tag modulates information onto a frequency-shifted carrier for reception at the at least one RF backscatter receiver.

16. The product tagging system tag of claim 14, wherein the passive RF backscatter tag switches on or off a packet sent by the at least one RF backscatter transmitter to convey information on the frequency-shifted main carrier RF signal to the at least one RF backscatter receiver.

17. The product tagging system tag of claim 14, wherein the passive RF backscatter tag encodes information on the frequency-shifted main carrier RF signal as a baseband signal conforming to a packet structure receivable by the at least one RF backscatter receiver on an interface thereof.

18. A method for product tagging, comprising:
- emitting, by at least one RF backscatter transmitter, (i) a main carrier RF signal, and (ii) Radio Frequency (RF) signals on two frequencies whose summation forms a twin carrier RF signal;
- reflecting and frequency shifting, by a passive RF backscatter tag associated with a product, the main carrier RF signal to a different frequency using the twin carrier RF signal; and
- reading, by at least one RF backscatter receiver, the product on the different frequency by detecting a distributed ambient backscatter signal generated by a reflection and frequency shifting of the main carrier RF signal by the passive RF backscatter tag.

19. The method of claim 18, wherein the at least one RF backscatter transmitter uses one of two carrier tones of the twin carrier RF signal as the main carrier RF signal.

20. The method of claim 18, wherein the at least one RF backscatter transmitter uses a separate carrier for the main carrier RF signal with respect to two carrier tones of the twin carrier RF signal that form the main carrier RF signal.

\* \* \* \* \*